(12) United States Patent
Wei et al.

(10) Patent No.: US 10,749,750 B2
(45) Date of Patent: Aug. 18, 2020

(54) METHOD AND SYSTEM FOR VIRTUAL SERVER DORMANCY

(71) Applicant: Open Text Corporation, Waterloo (CA)

(72) Inventors: Shu-Shang Sam Wei, Danville, CA (US); Shreyas Satyanand Kaushik, Bangalore (IN); Edward C. Bueche, Pleasanton, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

(21) Appl. No.: 16/037,921

(22) Filed: Jul. 17, 2018

(65) Prior Publication Data

US 2018/0324049 A1 Nov. 8, 2018

Related U.S. Application Data

(63) Continuation of application No. 15/588,276, filed on May 5, 2017, now Pat. No. 10,063,418, which is a
(Continued)

(51) Int. Cl.
*H04L 12/24* (2006.01)
*H04L 29/06* (2006.01)
(Continued)

(52) U.S. Cl.
CPC ......... *H04L 41/0889* (2013.01); *H04L 12/12* (2013.01); *H04L 41/082* (2013.01); *H04L 41/0859* (2013.01); *H04L 41/50* (2013.01); *H04L 43/0805* (2013.01); *H04L 67/02* (2013.01); *H04L 67/10* (2013.01); *H04L 67/1008* (2013.01); *H04L 67/2809* (2013.01); *H04L 67/2842* (2013.01); *H04L 67/34* (2013.01); *H04L 67/42* (2013.01); *Y02D 50/40* (2018.01)

(58) Field of Classification Search
None
See application file for complete search history.

(56) References Cited

U.S. PATENT DOCUMENTS 7,137,139 B1 11/2006 Smith
8,793,371 B1 7/2014 Nanekar
(Continued)

OTHER PUBLICATIONS

Office Action for U.S. Appl. No. 13/430,943, dated May 1, 2015, 17 pages.
(Continued)

*Primary Examiner* — Brian Whipple
(74) *Attorney, Agent, or Firm* — Sprinkle IP Law Group

(57) ABSTRACT

A method for providing a dormant state for content management servers is provided. Client devices are allowed to conduct transactions with servers when the servers are active. However, in a dormant state, the servers are not allowed to accept new transactions. Thus, by utilizing the dormant state, software upgrades can be made to one server at a time. Alternatively, all servers can be taken down for major upgrades, with the servers still operated in a read-only mode based on a file image from a point in time just prior to the shutdown. When the upgrade is completed, the servers can be returned to the active state.

10 Claims, 25 Drawing Sheets

Related U.S. Application Data continuation of application No. 13/430,943, filed on Mar. 27, 2012, now Pat. No. 9,648,138.

(51) Int. Cl.
*H04L 29/08* (2006.01)
*H04L 12/12* (2006.01)
*H04L 12/26* (2006.01)

(56) References Cited

U.S. PATENT DOCUMENTS

| | | | |
|---|---|---|---|
| 9,083,579 B1 | 7/2015 | Kaushik et al. | |
| 9,648,138 B1 | 5/2017 | Wei et al. | |
| 9,686,208 B2 | 6/2017 | Kaushik et al. | |
| 9,853,912 B2 | 12/2017 | Kaushik et al. | |
| 10,063,418 B2 | 8/2018 | Wei et al. | |
| 2002/0037735 A1 | 3/2002 | Maggenti et al. | |
| 2002/0102999 A1 | 8/2002 | Maggenti et al. | |
| 2003/0033362 A1 | 2/2003 | King et al. | |
| 2006/0069780 A1 | 3/2006 | Batni et al. | |
| 2007/0061327 A1* | 3/2007 | Oscherov | H04L 67/2842 |
| 2008/0148083 A1 | 6/2008 | Pesavento et al. | |
| 2009/0006884 A1 | 1/2009 | Cahill et al. | |
| 2009/0113058 A1 | 4/2009 | Ou et al. | |
| 2009/0241176 A1 | 9/2009 | Beletski et al. | |
| 2010/0058093 A1 | 3/2010 | Danieli et al. | |
| 2010/0153524 A1* | 6/2010 | Rehm | H04L 67/1029 709/221 |
| 2010/0218005 A1 | 8/2010 | Jain et al. | |
| 2010/0251335 A1 | 9/2010 | Srisuresh | |
| 2011/0161957 A1 | 6/2011 | Bernardi et al. | |
| 2012/0084560 A1 | 4/2012 | Jayaraman | |
| 2014/0258984 A1 | 9/2014 | Kramer | |
| 2017/0244605 A1 | 8/2017 | Wei et al. | |
| 2019/0042321 A1 | 2/2019 | Venkatesh | |
| 2019/0095254 A1 | 3/2019 | Rao | |

OTHER PUBLICATIONS

Office Action for U.S. Appl. No. 13/430,943, dated Oct. 6, 2015, 19 pages.
Office Action for U.S. Appl. No. 13/430,943, dated Mar. 14, 2016, 21 pages.
Office Action for U.S. Appl. No. 13/430,943, dated Aug. 19, 2016, 21 pages.
Office Action for U.S. Appl. No. 15/588,276, dated Jul. 21, 2017, 19 pages.
Office Action for U.S. Appl. No. 15/588,276, dated Nov. 13, 2017, 7 pages.
Notice of Allowance for U.S. Appl. No. 15/588,276, dated Apr. 16, 2018, 7 pages.
Office Action for U.S. Appl. No. 16/138,623, dated Apr. 9, 2020, 10 pgs.

* cited by examiner

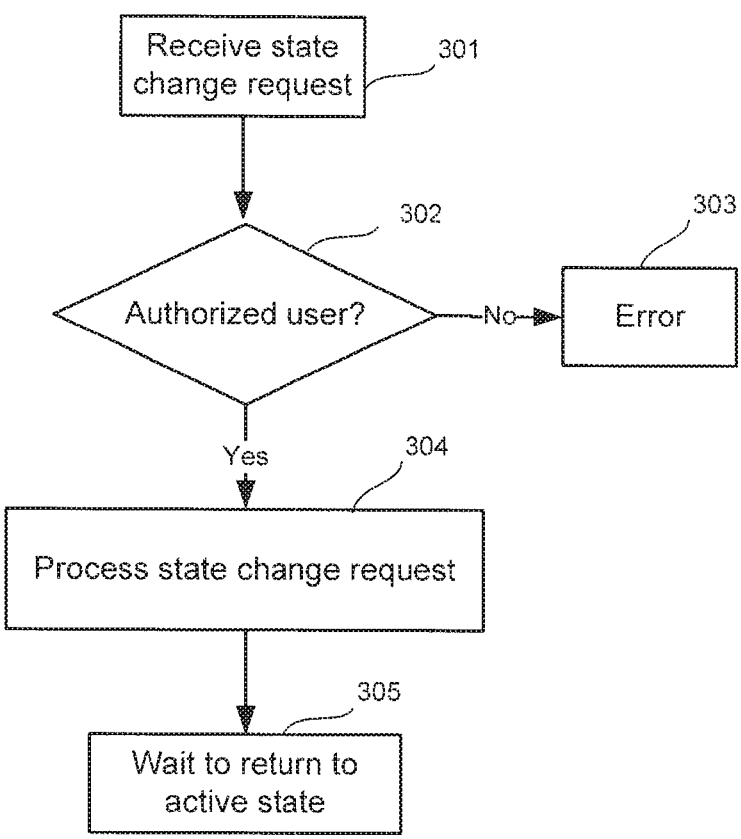

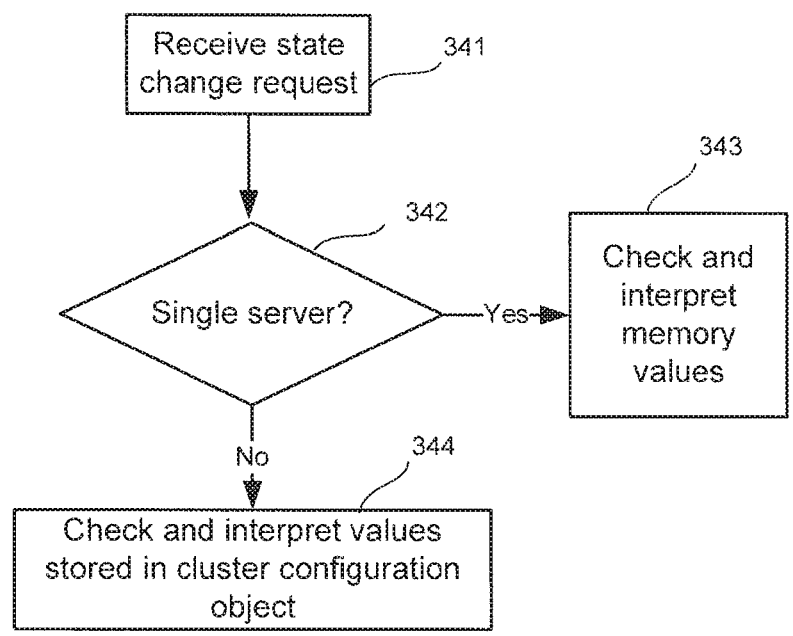

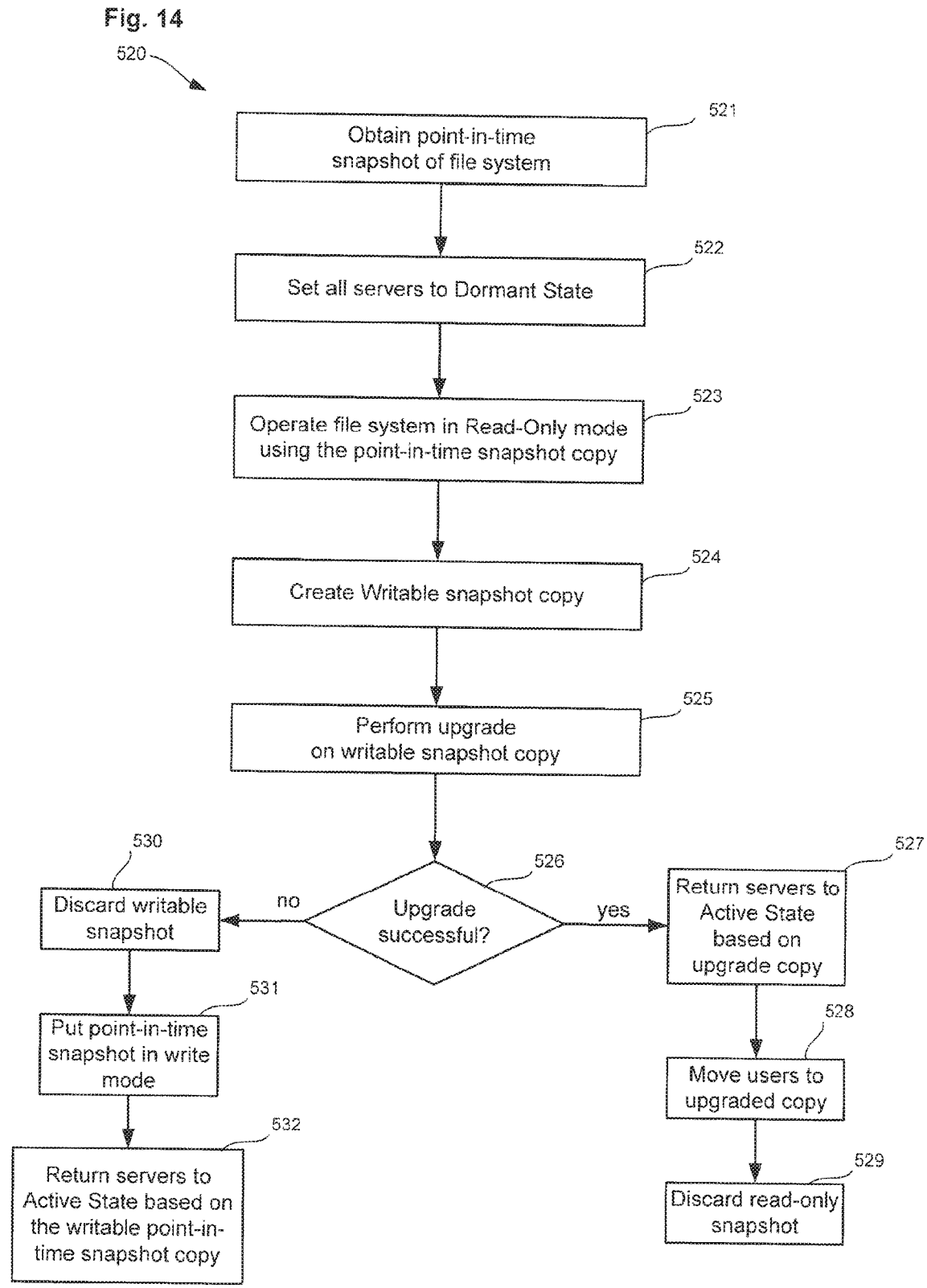

METHOD AND SYSTEM FOR VIRTUAL SERVER DORMANCY

CROSS-REFERENCE TO RELATED APPLICATION(S)

This application is a continuation of, and claims a benefit of priority under 35 U.S.C. § 120 from, U.S. patent application Ser. No. 14/588,276, filed May 5, 2017, entitled "METHOD AND SYSTEM FOR VIRTUAL SERVER DORMANCY," now issued as U.S. Pat. No. 10,063,418, which is a continuation of, and claims a benefit of priority under 35 U.S.C. § 120 from, U.S. patent application Ser. No. 13/430,943, filed Mar. 27, 2012, entitled "METHOD AND SYSTEM FOR VIRTUAL SERVER DORMANCY," now issued as U.S. Pat. No. 9,648,138, which is fully incorporated by reference herein for all purposes.

TECHNICAL FIELD

This disclosure relates generally to the field of virtual server deployment, and more particularly, to active and dormant states of operation for server components.

BACKGROUND OF THE RELATED ART

An enterprise-ready platform for server virtualization and cloud computing provides many advantages for users. As one example, users benefit from having an enterprise service providing a content management system and repository. However, such solutions often have many components, such as contents in a file system, full-text index on a full-text engine, and metadata in a database system, as well as the logic and instructions for managing these resources. Where there are multiple components, it can be difficult if not impossible for them to be properly synchronized in order to guarantee data integrity.

One prior solution was to manually shut down each component to ensure that no system data would be changed during the interval when a component was shutdown. This of course causes extra downtime for the system.

It would be desirable to provide a mechanism to make components aware of the availability of other components so as to minimize downtime and to perform upgrade and restarts safely and seamlessly.

It would also be desirable to provide more elasticity in the system architecture so that capacity could be adjusted and balanced, or dynamically provisioned, with simple techniques.

BRIEF DESCRIPTION OF THE DRAWINGS

FIGS. 7A and 7B are flow charts illustrating a process for changing server states;

FIG. 10A is flow chart illustrating a process for changing server states in a single server or a server cluster;

FIG. 14 is a flow chart illustrating an alternative process for moving servers to a dormant state and marking changes to the server while in the dormant state;

DETAILED DESCRIPTION

This disclosure describes systems and methods for providing and using a dormant state in components of an enterprise content management system and repository. A component in the dormant state cannot accept any new connections, and will become read-only for any existing connections, except that pending transactions will first be committed or aborted. Only users with a specialized privilege setting are able to set and use the dormant state.

The dormant state is useful to provide flexibility to the system. For example, in the cloud-based environment, the ability to scale up or scale down to adjust and balance for system load requirements on-demand is critical. The use of the dormant state provides a simple tool to scale down a server deployment. Likewise, the dormant state may be used as a tool for load balancing.

The dormant state is also useful to perform software upgrades and updates. For example, each server in a server cluster may be placed in a dormant state one at a time, provided with a software upgrade, then returned to its active state. Alternatively, if all components are placed into a dormant state, a read-only image of one point-in-time of the components is provided until the components are ready to be placed back in the active state.

Prior to describing the subject matter in detail, an exemplary hardware device in which the subject matter may be implemented is first described. Then, an exemplary hardware and software environment in which the exemplary hardware device operates will be described. Finally, techniques for operating devices in the exemplary environment will be described. Those with ordinary skill in the art will appreciate that the elements and/or components described may vary depending on the implementation.

1. Operating Environment

Figure 1:
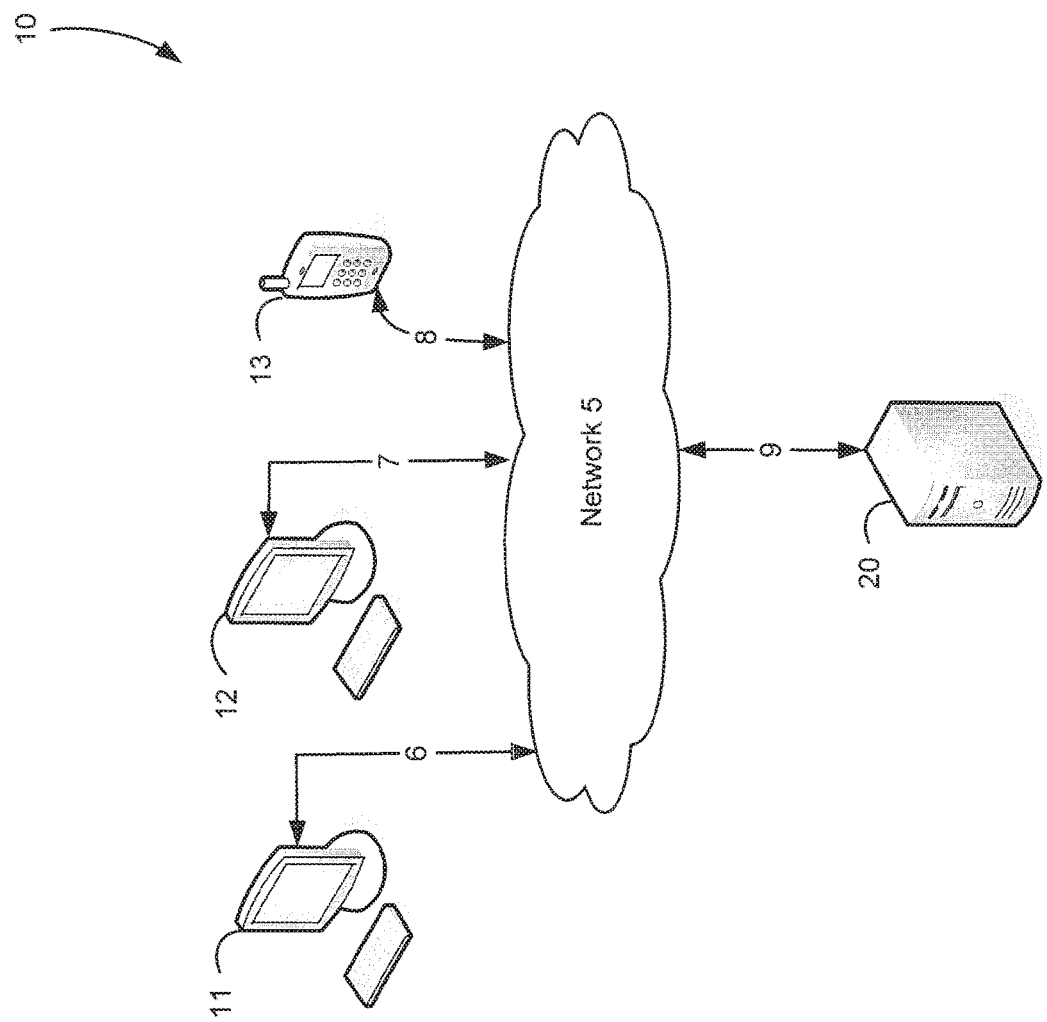
FIG. 1 is a block diagram illustrating a distributed computing system.

FIG. 1 is a simplified block diagram of a distributed computer network 10. Computer network 10 includes a number of client systems 11, 12, 13 coupled to a server system 20 via a communication network 5. Each of the client systems 11, 12, 13 and the server system 20 are coupled to the communication network 5 by communication links 6, 7, 8, 9, respectively. There may be any number of clients and servers in a system. Communication network 5 provides a mechanism for allowing the various components of distributed network 10 to communicate and exchange information with each other.

Communication network 5 may include many interconnected computer systems and communication links. Communication links 6, 7, 8, 9 may be hardwire links, optical links, satellite or other wireless communications links, wave propagation links, or any other mechanisms for communication of information, and may be the same or different for the various hardware components that are coupled to the network 5. Various communication protocols may be used to facilitate communication between the various systems shown in FIG. 1, including TCP/IP, HTTP protocols, wireless application protocol (WAP), vendor-specific protocols, customized protocols and others. In one embodiment, communication network 5 is the Internet, while in other embodiments, any suitable communication network may be used including a local area network (LAN), a wide area network (WAN), a wireless network, an intranet, a private network, a public network, a switched network, any combinations of these, and the like.

Distributed computer network 10 is merely one illustrative embodiment and is not intended to limit the scope of the disclosure. One of ordinary skill in the art would recognize many other variations, modifications and alternatives in how to effectively arrange such components and systems.

In a typical client/server arrangement as shown in FIG. 1, one or more client systems may request information from the server system, which responds to the client by providing the requested information. For this reason, a server system will typically have more computing and storage capacity than client systems, and indeed, the server system may be a gateway and content manager for providing access to content storage and related repository services as further described below. However, a particular computer system may act as either a client or a server depending on whether the computer system is requesting or providing information. Further, although aspects of the subject matter disclosed herein are described as using a client/server environment, it should be apparent that the subject matter may be embodied in other ways, for example, as a stand-alone computer system, or part of a cloud-computing environment.

Server system 20 receives requests for information from one or more of client systems 11, 12, 13 and performs processing in order to satisfy the requests, then forwards the resultant information back to the requesting client system. The processing required to satisfy the request may be performed by server system 20 or may alternatively be delegated to or obtained with the help of other servers connected to communication network 5 or to server system 20.

Client systems 11, 12, 13 enable users to access and query information stored or managed by server system 20. In one embodiment, a web browser application executing on a client system enables users to select, access, retrieve and/or query information stored or managed by server system 20. Examples of web browser programs include the Internet Explorer browser by Microsoft Corporation, the Firefox browser by Mozilla Foundation, and others.

Figure 2:
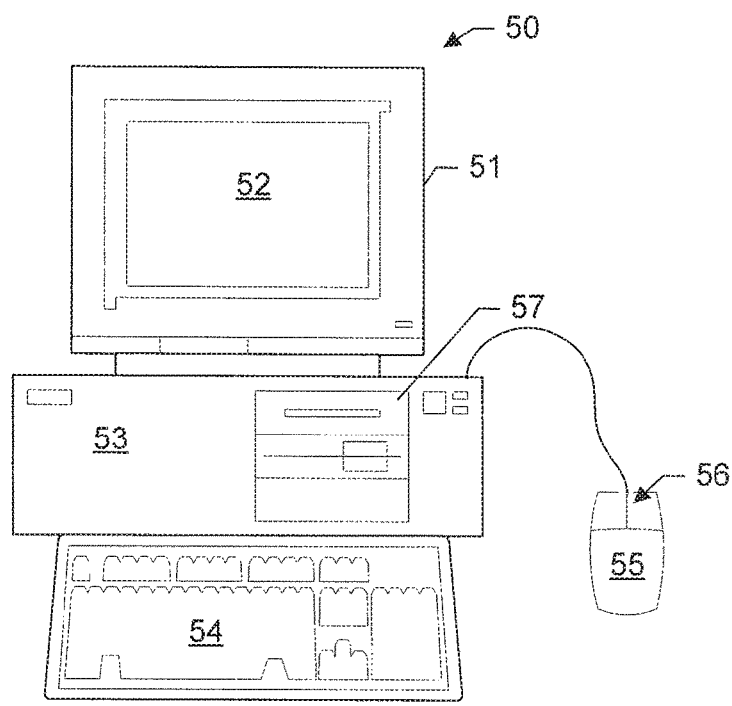
FIG. 2 is a front view of a computer workstation useful in the distributed computing system of FIG. 1.

FIG. 2 shows an exemplary computer workstation 50 that may serve as either a client or server system, including a monitor 51 with display screen 52, CPU cabinet 53, keyboard 54 and mouse 55 having one or more selection buttons 56. CPU cabinet 53 houses familiar computer components, such as mass storage devices 57, and other internal components which are not shown, such as a processor, memory, and the like, as further described with reference to FIG. 3 below.

Mass storage devices 57 may include disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

The subject matter described herein may be computer-implemented in a suitable system by providing computer-executable instructions stored on a non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic energy, radio frequency signals, acoustic or light waves, such as those generated during radio wave and infrared data communications.

For example, a binary machine-executable version of software instructions for providing the features described herein may be stored or reside in RAM or cache memory, or on mass storage device 57. The source code of the software may also be stored or reside on mass storage device 57 (e.g., hard disk, magnetic disk, tape or CD-ROM). As a further example, software code may be transmitted via wires or radio waves, or downloaded through a network such as the Internet.

Figure 3:
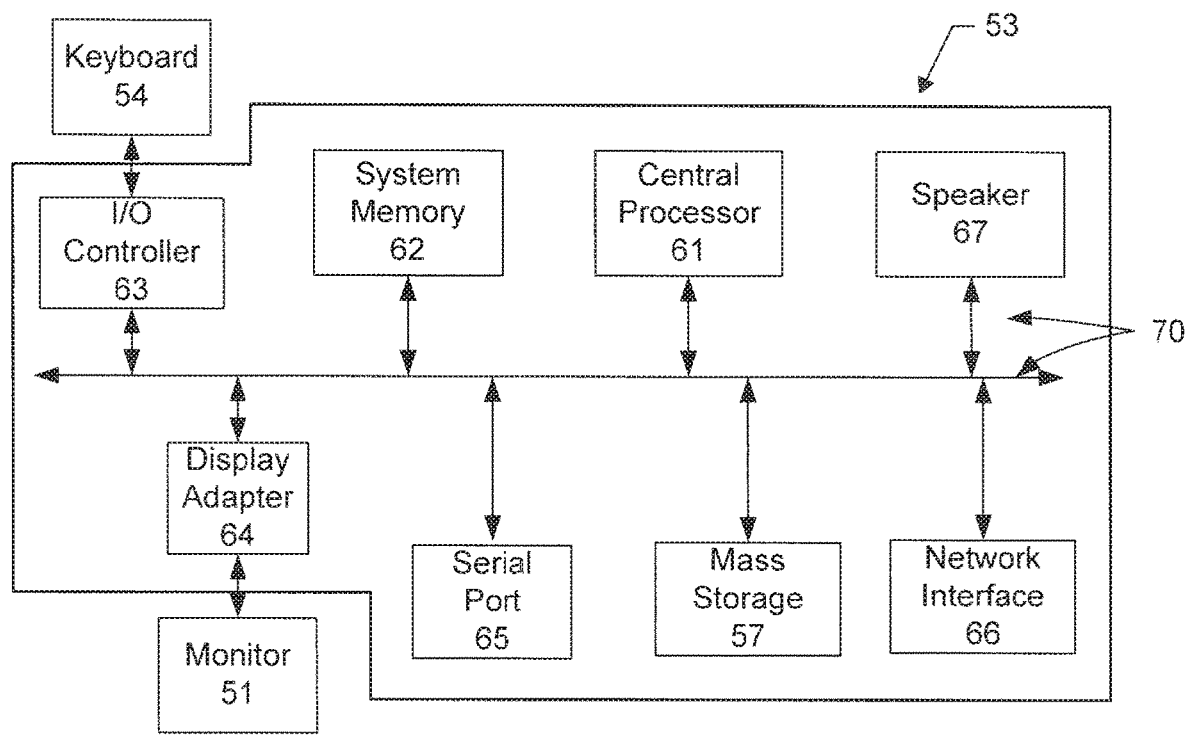
FIG. 3 is a block diagram of the components of the computer workstation of FIG. 2.

A system block diagram of the computer system/workstation 50 is shown in FIG. 3. The display monitor 51, keyboard 54 and storage devices 57 are as shown in FIG. 2. The CPU cabinet 53 contains key components such as central processor 61, system memory 62, input/output (I/O) controller 63, display adapter 64, serial or universal serial bus (USB) port 65, network interface 66, and speaker 67. In other embodiments, a computer system may include more or fewer components and/or subsystems. For one example, a computer system could include more than one processor (i.e., a multiprocessor system) or a system may include a cache memory.

The system bus 70 of computer system 50 is exemplary of an interconnection scheme serving to link the subsystems. For example, speaker 67 could be connected to the other subsystems through a port or have an internal direct connection to central processor 61. The processor 61 may include multiple processors or a multi-core processor, which may permit parallel processing of information. Computer system 50 is only one example of a suitable computer system. Other configurations of components and/or subsystems suitable for use with the methods described herein will be readily apparent to one of ordinary skill in the art.

Computer software products may be written in any of various suitable programming languages, such as C, C++, C #, Pascal, Fortran, Perl, Matlab (from MathWorks), SAS, SPSS, JavaScript, AJAX, Java, SQL, and XQuery. A computer software product may be an independent application with data input and data display modules. Alternatively, computer software products may be classes that are instantiated as distributed objects, or component software such as Java Beans or Enterprise Java Beans (both by Oracle Corporation). In one embodiment, the subject matter described herein is embodied as a computer program product which stores instructions, such as computer code, that when executed by a computer cause the computer to perform the processes and/or techniques described below.

The computer system 50 runs an operating system (OS) to manage hardware resources and provide common application services for application software. As an example, the computer 50 may run a Microsoft Windows® operating system (e.g., Windows NT, Windows XP, Windows Vista, Windows 7, Windows CE, Windows Mobile), or Linux, UNIX, Sun OS, Solaris, Mac OS X, Alpha OS, AIX, IRIX32, or IRIX64. Other operating systems may also be used.

2. Content Management Platform

Figure 4:
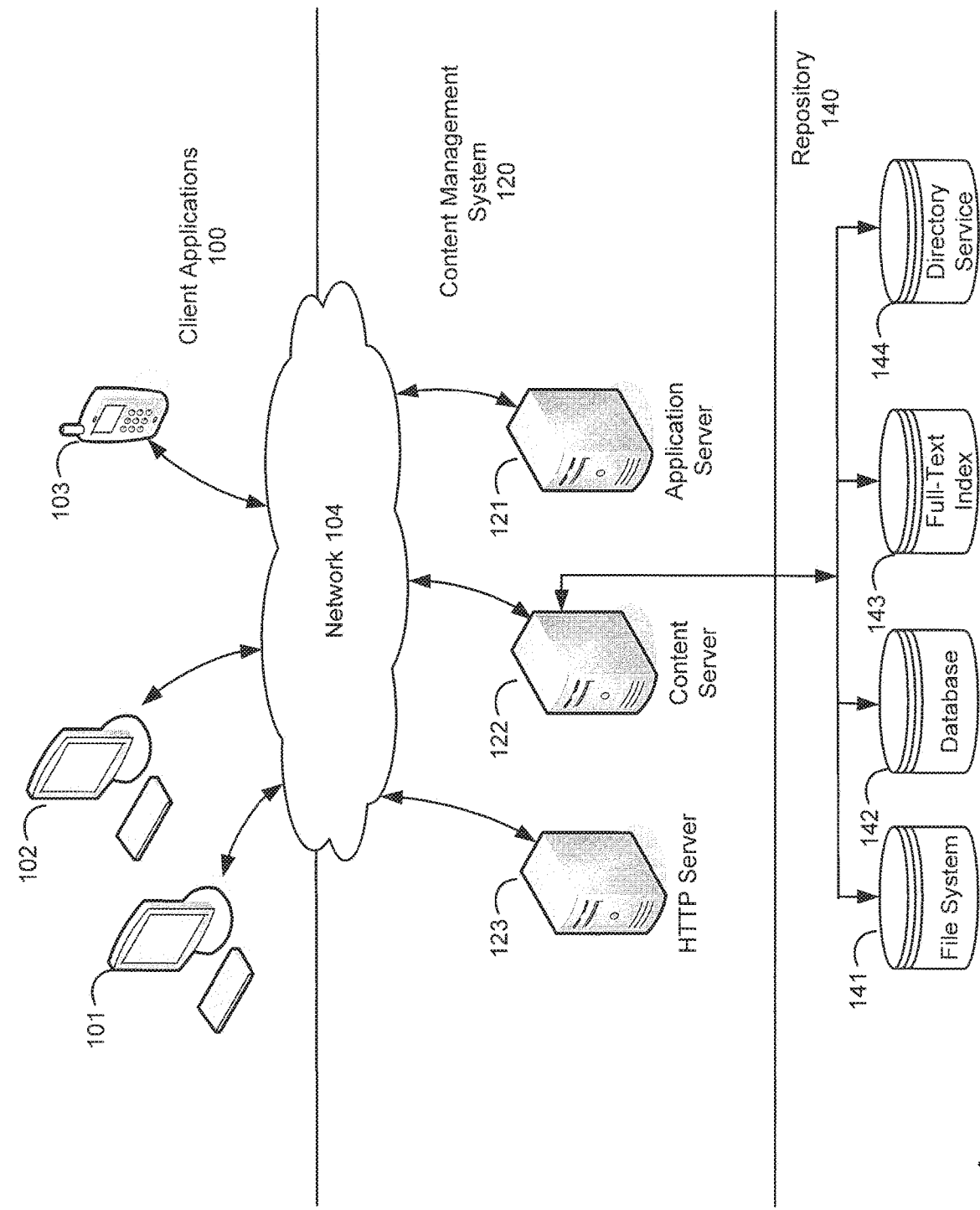
FIG. 4 is a block diagram illustrating the basic structure of an enterprise content management system.

FIG. 4 illustrates a more detailed embodiment of a distributed client/server system that provides an enterprise-level content management and repository service. A repository system 140 is operated and managed by a content management system 120, which in turn provides access to the repository for client applications 100.

The client applications 100 originate from client devices, such as devices 101, 102, 103, which communicate through a network 104 with an application server 121 in order to use one or more applications hosted on the application server. In one embodiment, the network 104 is an Ethernet connection using conventional TCP/IP communication methods with both client devices and server devices. However, other types of network connection technologies are well known and may also be used to full advantage, including LAN, WAN, storage area network (SAN), the Internet, etc. Client devices may be any type of processor-based digital device, such as a desktop or laptop computer, iPhone® or other smart hand-held device, or other.

The application server 121 hosts one or more applications running on a content management platform that provide access to repository 140 for clients hosted on content server 122, which is also accessible to clients via network 104. An HTTP server 123 is also coupled to the network 104 to provide an administrative terminal for system operators to perform system maintenance, logging, access control, etc., as further described below. In particular, the system operator may initiate a dormant state for server components to facilitate patches, upgrades, load balancing, and other useful operations as further described below.

The repository 140 is provided for use by client applications 100, through the content server 122, which is accessible to the client devices through a network 104. The repository 140 may include a file store 141 for storing content items, a relational database 142 for storing attributes/metadata associated with the content items, a full-text index store 143 for the content items, and directory services 144.

A software platform runs on each of the various components, such as the EMC Documentum Platform software and related EMC Enterprise Content Management software, distributed by EMC Corporation, Hopkington, Mass. The Documentum Platform provides capabilities for managing enterprise content and is the foundation for related content management and case management product offerings.

Figure 5:
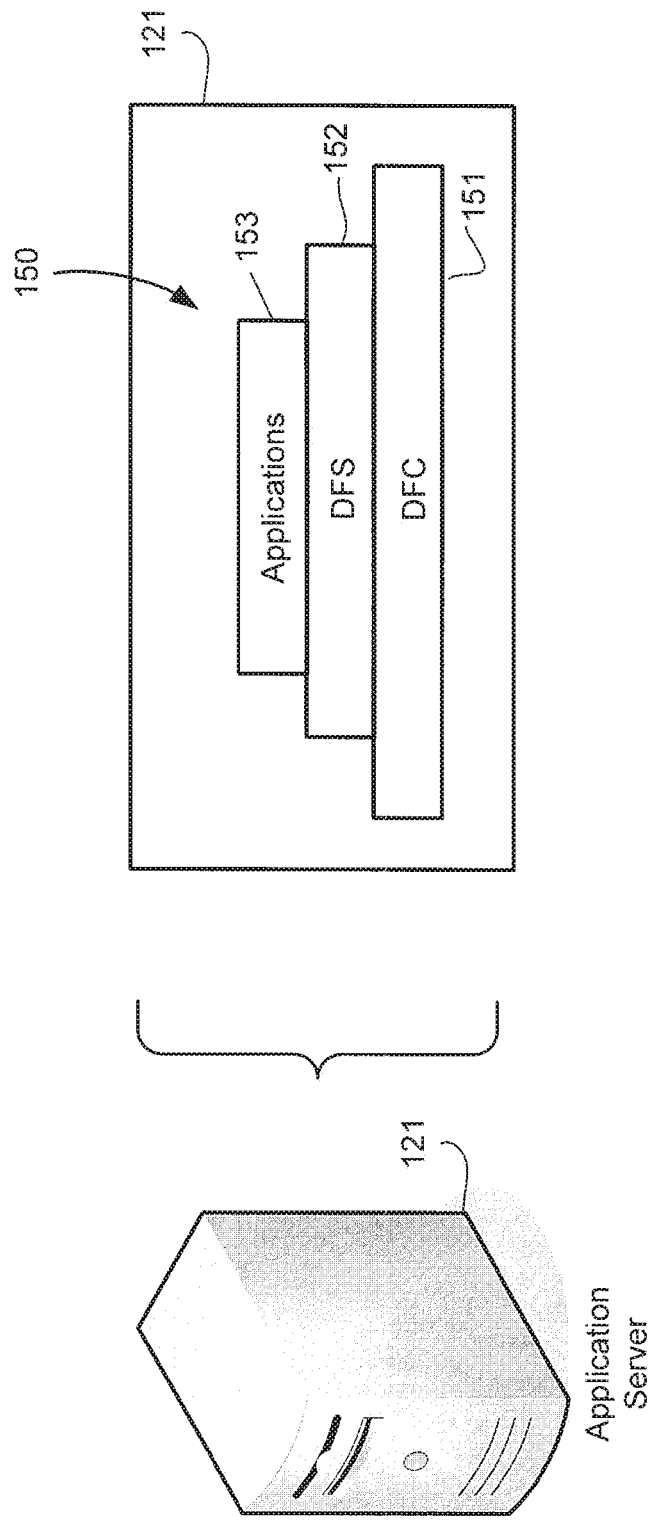
FIG. 5 is a block diagram illustrating the software framework implemented in a component of FIG. 1.

For example, FIG. 5 shows one simplified embodiment of the application server 121, which runs a content management framework 150 having a foundation layer 151, such as Documentum Foundation Classes (DFC), an interface layer 152, such as Documentum Foundation Services (DFS), and one or more applications on application layer 153 having integrated Documentum functionality through a Web Development Kit (WDK) or Webtop, for example. The HTTP server 123 runs a similar content management framework, for applications such as System Administrator or Intranet Client.

DFC is the programming interface for accessing the functionality of the Documentum platform through Java and COM class libraries and underlies all Documentum platforms. DFS is an SOA development framework and application programming interface (API), based on web services, and designed to support interoperable machine-to-machine interaction over a network. DFS is now the primary interface for most developers and users of the Documentum platform, although use the terms DFC and DFS are frequently (although incorrectly) used interchangeably.

The Documentum platform also includes an extensible Business Objects Framework (BOF) which is built into DFC. BOF provides a useful framework and methodology for developing reusable business logic components called Business Objects that can be plugged into middle tier or client applications. More information about the Documentum Platform and related content management and case management product offerings can be found on the EMC website located at URL www.emc.com.

Figure 6A:
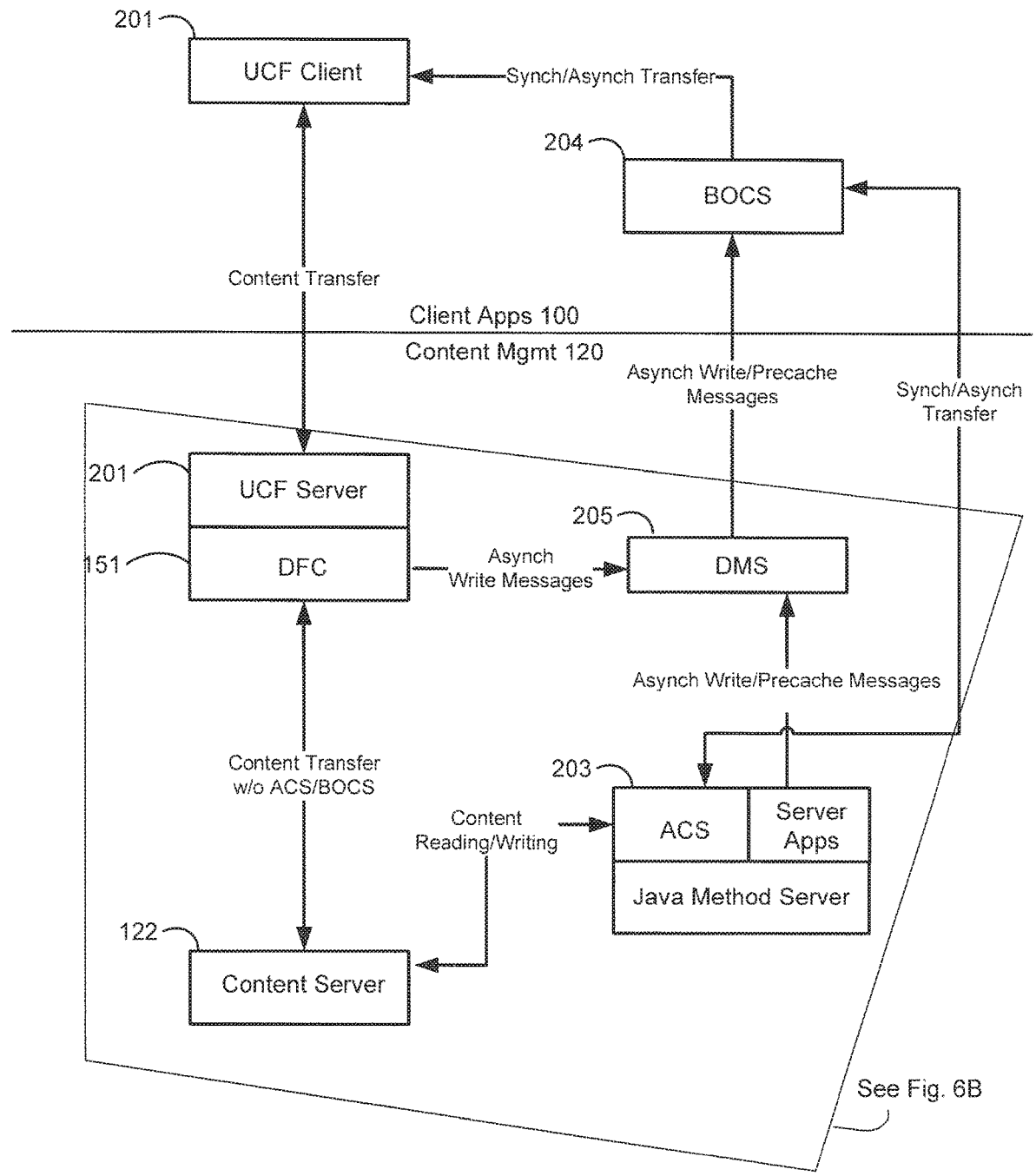
FIG. 6A is a block diagram showing a simplified arrangement of components for content transfer operations.

FIG. 6A is a simplified diagram of the relevant Documentum components that work together in one embodiment to implement content transfer sessions. Documentum provides a utility called Unified Client Facilities (UCF) that is used to transfer content between servers and clients. A UCF client component 201 runs as a Java applet on a client machine. A UCF server component 202 runs on the application server 121, with integrated DFC 151 of the content management framework. One route for content transfer to and from the repository is through the content server 122, the UCF Server 202 and the UCF client 201.

A faster route for content transfers is through an Accelerated Content Server (ACS) 203. ACS 203 is installed with each content server installation (including primary content server (CS) and remote content server (RCS)) and provides direct access to content on the content server machine 122 for synchronous or asynchronous transfer to a local cache 204. ACS is installed as a web application in the embedded application server as part of each content server, and is run as a Java Method Server. The local cache 204 is called a Branch Office Caching Server (BOCS) in the Documentum platform, and is a light-weight cache server 203 that allows remote users to read and write content from/to local servers. The Documentum Messaging Server 205 receives and delivers messages between applications, such as requests for action from DFC 151 on the application server to the BOCS 203.

Figure 6B:
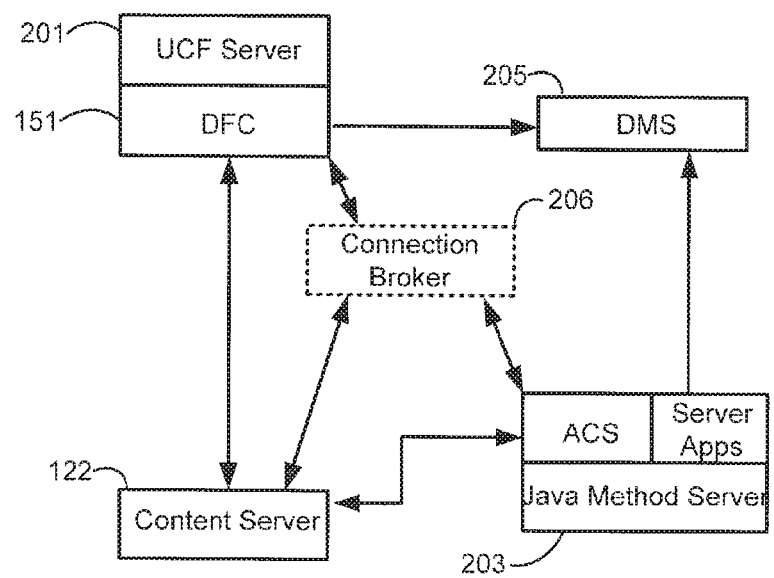
FIG. 6B is a portion of FIG. 6A with the addition of a connection broker component.
Figure 6C:
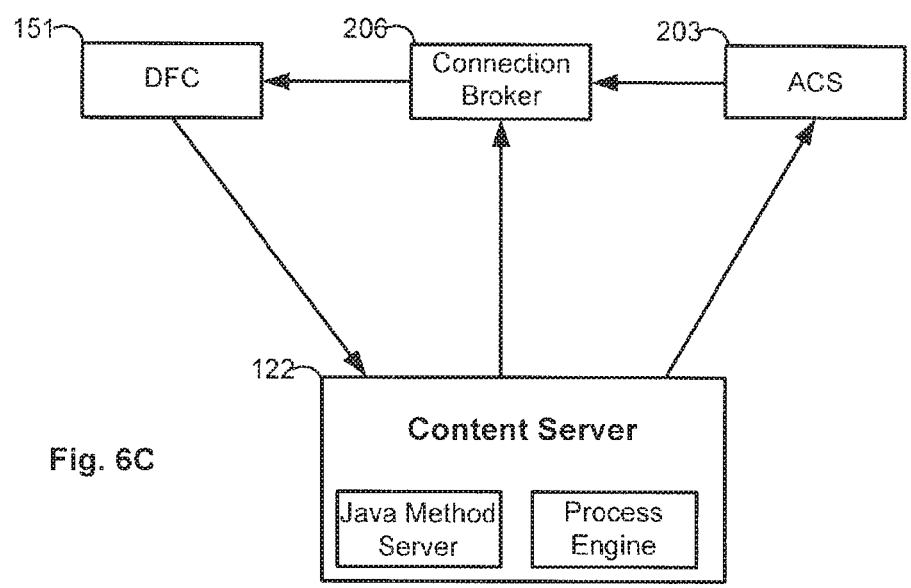
FIG. 6C is a simplified version of FIG. 6B.

FIG. 6B is a portion of FIG. 6A showing how a connection broker 206 may be used as an intermediary between the content server 122, the ACS 203, and the DFC 151. FIG. 6C is a simplified version of FIG. 6B. The connection broker 206 is a name server for the Documentum content server. When a connect method is issued, the request goes to the connection broker identified in an initialization file (dm-cl.ini) in the client device. The connection broker provides a list of active content servers in return to the application server/DFC 151, and the DFC establishes a session with one of the active servers.

Note that the connection broker 206 does not request information from the content server 122, but relies on the server to regularly broadcast or project its status/connection information to the connection broker. This feature, i.e., which connection broker to project to, is set in the configuration file (config.ini) on each server.

3. Providing a Dormant State for the Server

According to several embodiments described herein, server components may be configured with a "dormant" state of operation wherein no new connections with clients are accepted, and existing connections/sessions are made read-only. Any pending transactions in existing sessions are preferably completed prior to moving to read-only status. When a server is in the dormant state, its status at the connection broker will be updated, and the connection broker will notify end users that new connections can be made to that server.

The dormant state will be invoked through program instructions executed in relevant computer-implemented components, for example, using a remote procedure call (RPC) in the server, and application programming interfaces (APIs) in other components having DFC and DFS frameworks. Examples of such instructions are included in the Appendix below. Instructions should also include status checks to see whether the selected components are in the dormant state or not.

The dormant server state may be useful to help avoid overloading issues. For example, a server that appears to be failing or becoming overloaded may be moved to a dormant state so that it can avoid processing new tasks and simply complete processing of its existing load if possible. The server may then be taken offline for evaluation, upgrade, repair or replacement as necessary.

The dormant state may be used to provide system flexibility, for example, by being part of a scheme to balance loads across a system of multiple servers, or to allocate the deployment of resources dynamically in a multiple server system.

The dormant state may also be useful to make component and/or system upgrades, such as a software patch, service pack, minor release, or major release. For example, in one embodiment described below, the dormant state facilitates performing upgrades in a multiple server system by moving one server at a time to the dormant state, upgrading the server, then returning the server to active service.

The dormant state can only be set or reset by members of a privileged access group. For example, a group called Data Center Managers (dm_datacenter_managers) can be established and maintained by a superuser and/or group administrator to use and administer a server or server cluster resource with, among other things, the techniques described herein.

Figure 7B:
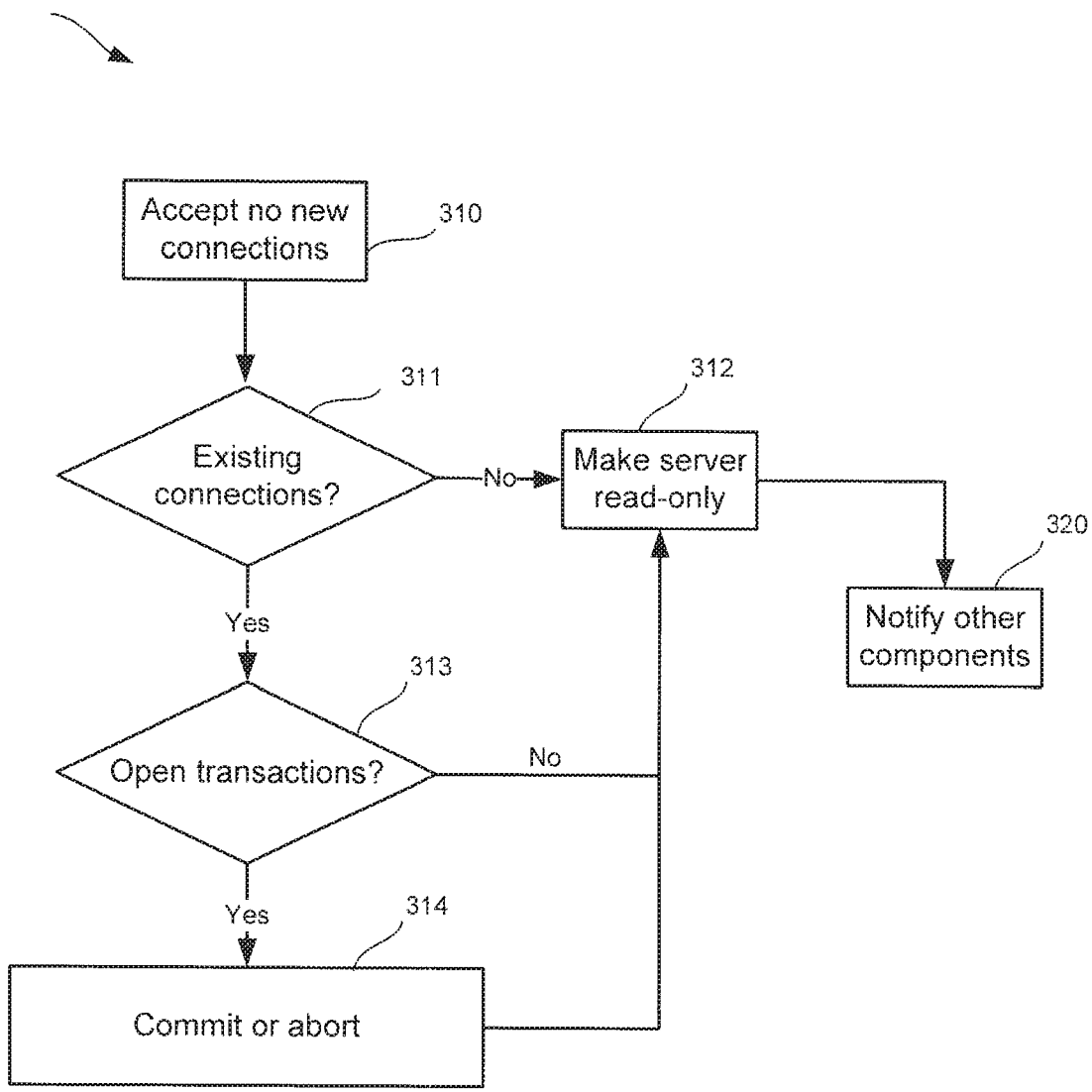

In one embodiment, the dormant state may be implemented in a server through the process 300 shown in FIG. 7A. In step 301, a request to change state to a dormant mode is received by the server, for example, as sent by a user, such as Data Center Manager. In step 302, the authorization of the user making the request is tested. If the user is not authorized for this operation, i.e., a member of the Data Center Managers group, then an error is generated in step 303. If the user is authorized in step 302, then the server proceeds to process the state change request in step 304, as further illustrated in FIG. 7B. When the processing associated with the state change request is complete, the server waits in step 305 to be placed back into active service.

One embodiment for processing the state change request of step 304 is illustrated in FIG. 7B. In step 310, the server is configured to not accept any new connections from regular users (but see exception for privileged users below). The server then checks in step 311 to see if there are any existing connections. If not, then in step 312 the server is changed to a read-only state, and other system components are notified accordingly as necessary in step 320. If there are existing connections, then in step 313, the server checks to see if there are open transactions pending for these sessions. If not, then the server moves to the read-only state in step 312. If there are open transactions in the existing connections in step 313, then those transactions are allowed to commit or abort in step 314, before the server is moved to the read-only state in step 312.

The objectives of the dormant state for a content server are largely met by prohibiting new connections to the server and by allowing server content to be accessed in a read-only mode. However, an exception to the prohibition against new connections may be provided for the privileged user group to allow them to connect and perform regular content server and repository transactions as well as administrative tasks. However, if these privileged users want to perform update operations, they need to explicitly enable that feature in the configuration object.

In the context of the content management system described above, in addition to providing notification of the changed server state, there are other restrictions that may need to be enforced by the content server upon entering a dormant state. For example, where the content server manages a repository, the elements of the repository can also be made read-only through the content server—no changes can be made to content in the file system, to metadata in the database, or to the repository index. Further, the job agent, which normally schedules and processes jobs for the server, is prohibited from processing jobs, and methods are prohibited from launching through the Java Method Server by not sending any HTTP post instructions.

In addition to the content server, other components may need to be made dormant, or at least have their behaviors defined for the times when one or more content servers is dormant. For example, when a content server is moved to a dormant state, the ACS associated with that content server should also be moved to a dormant state. The dormant status of the ACS should be persisted, for example, in the ACS configuration object. When the ACS is moved to the dormant state, no new read or write operations for content are allowed. However, all read and write operations that are currently running are allowed to complete. Instructions to set the dormant state and check the dormant status of the ACS are implemented as APIs in the ACS.

The connection broker may also be set to a dormant state, and that status persisted. When dormant, the connection broker will not send a server map in response to a client request, and may stop receiving status projections from other components (like content server and ACS). Instructions to set the dormant state and check the dormant status of the connection broker are implemented as APIs, which will be used by the DFS to check if it can pull information from the connection broker, and by the ACS to see if it can project information to the connection broker.

The Java Method Server will generally not be moved to a dormant state, largely because some instances of the JMS can be shared by multiple servers. This can be readily handled by having the server in its dormant state not post method execution requests to the JMS. If all servers using a particular JMS become dormant, then the JMS will simply have no methods to execute.

Figure 8A:
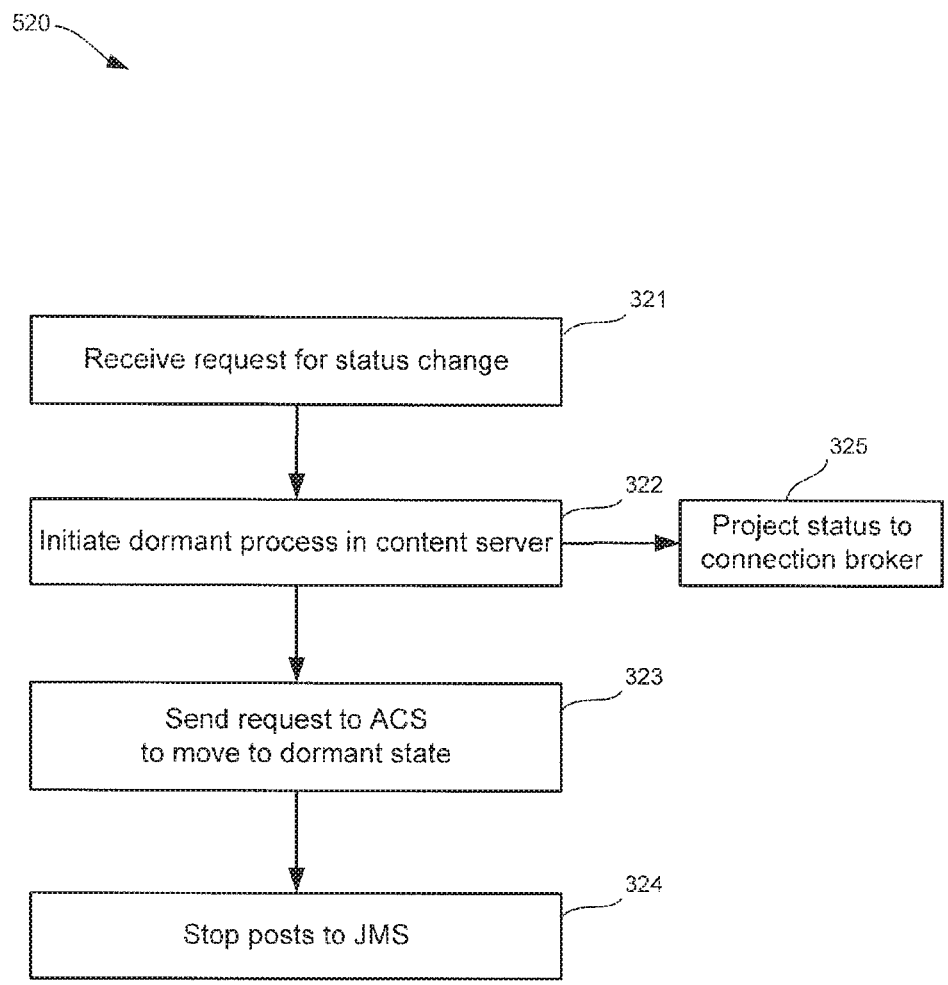
FIG. 8A is a flow chart illustrating a process for changing server states.

FIG. 8A illustrates a method 320 implemented in the content server for using the dormant state in a content server deployment. A request for a status change is received from the Data Center Manager in step 321. Upon receiving the request, three things happen: (i) the status change to dormant for the content server is initiated in step 322 (for example, as described with reference to FIGS. 7A-7B above); (ii) a request to make a status change to dormant is sent to the ACS in step 323; and (iii) posts to the Java method server are stopped in step 324. After changing its status to dormant in step 322, the content server projects its changed status to the connection broker in step 325. The ACS will also project its status change to the connection broker upon entering the dormant state.

Figure 8B:
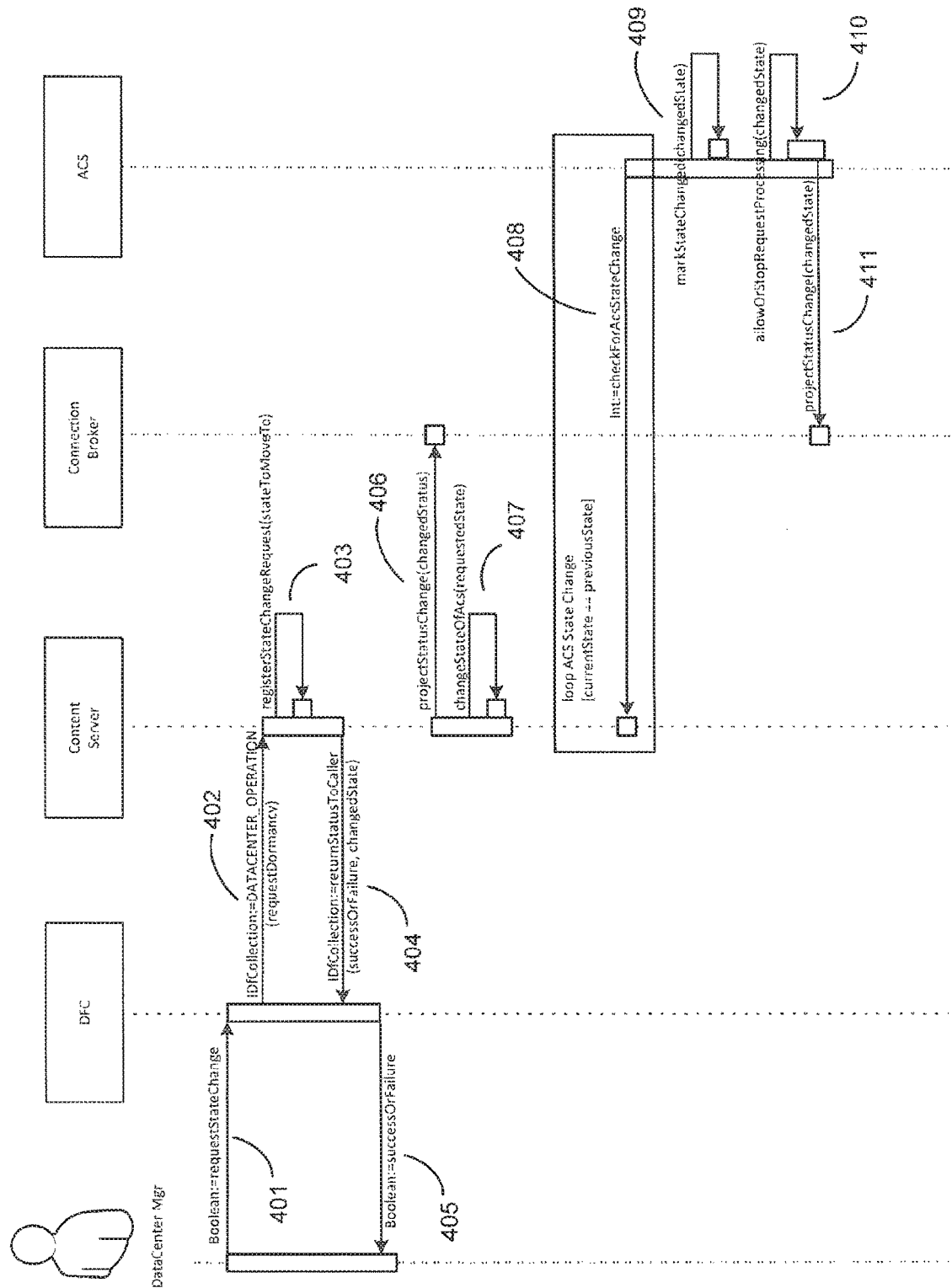
FIGS. 8B and 8C are diagrams illustrating the sequence for changing state in the content server.
Figure 8C:
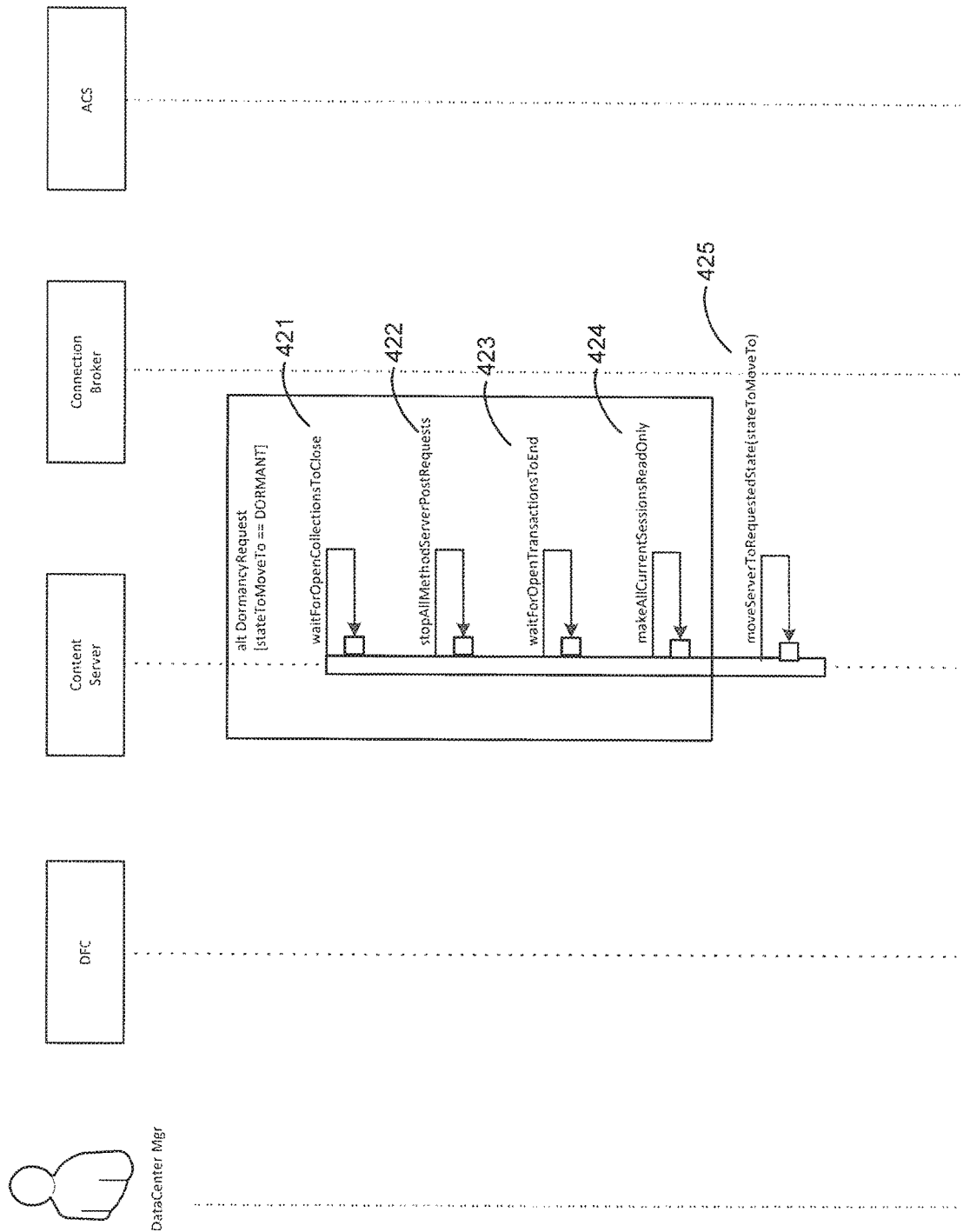

These steps are more clearly illustrated in the sequence diagram for a state change in the content server and related components shown in FIGS. 8B and 8C. As noted above, these changes may be implemented through suitable instructions formed in RPCs in the content server and APIs in the other components, examples of which are provided in the Appendix below. In FIG. 8B, a Data Center Manager with suitable privileges makes a request for the state change, typically through a client device or admin terminal located internally to the content management system 120, for example at the HTTP server 123 (rather than externally through the client application layer 100). The request is sent to the DFC layer in step 401. The state change request triggers an RPC in the content server to "requestDormancy" in step 402. In step 403, the content server registers the state change request. In step 404, the result (success or failure) is reported back to the DFC, which likewise reports back to the Data Center Manager in step 405.

When the state change is registered with the content server in step 403, the content server also projects the changed state to the connection broker in step 406, and initiates a request for the ACS server to also change state in step 407. Step 408 is a loop run in the ACS that checks for any state change requests from the content server, e.g. in step 407. When a state change request is received by the ACS, it changes state in step 409, then either stops processing requests if changed to dormant state, or allows requests if changed to active state, in step 410. The status change is then projected to the connection broker in step 411.

In FIG. 8C, upon receiving a dormancy request, the content server waits for current sessions to either commit or abort. For example, the content server waits for open data collections to close (step 421); stops all post requests to the Java Method Server (step 422); waits for all open transactions to close (step 423); and makes any current sessions read-only (step 424).

Finally, in step 425, the content server is moved to the requested state. If the requested state is the active state, then after the ACS changes state, the content server is moved to the active state. If the requested state is the dormant state, then after current sessions are committed or aborted, the content server is moved to the dormant state.

Figure 9A:
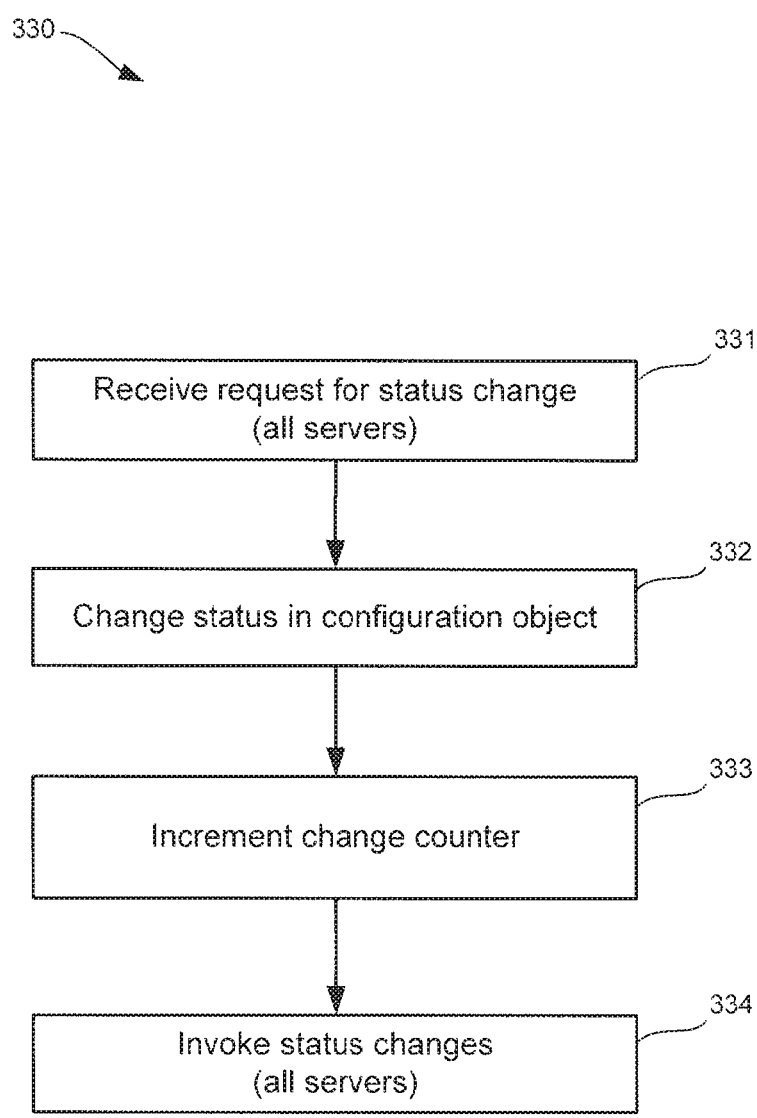
FIG. 9A is a flow chart illustrating a process for changing server states in a server cluster.

FIG. 9A illustrates a method 330 implemented in the content server or connection broker for using the dormant state in a multi-server (server cluster) deployment. A request from the Data Center Manager is received in step 331, but note this request specifies "all servers." Upon receiving the request, three steps occur: (i) the status in the configuration object for the server cluster is changed in step 332; (ii) a counter is incremented in the change record in step 333; and (iii) a process thread is used to invoke status changes for all servers in step 334. For example, "Change Checker" is a simple thread or process that wakes up periodically to look for changes from other servers and refresh the changes to its server instances.

Figure 9B:
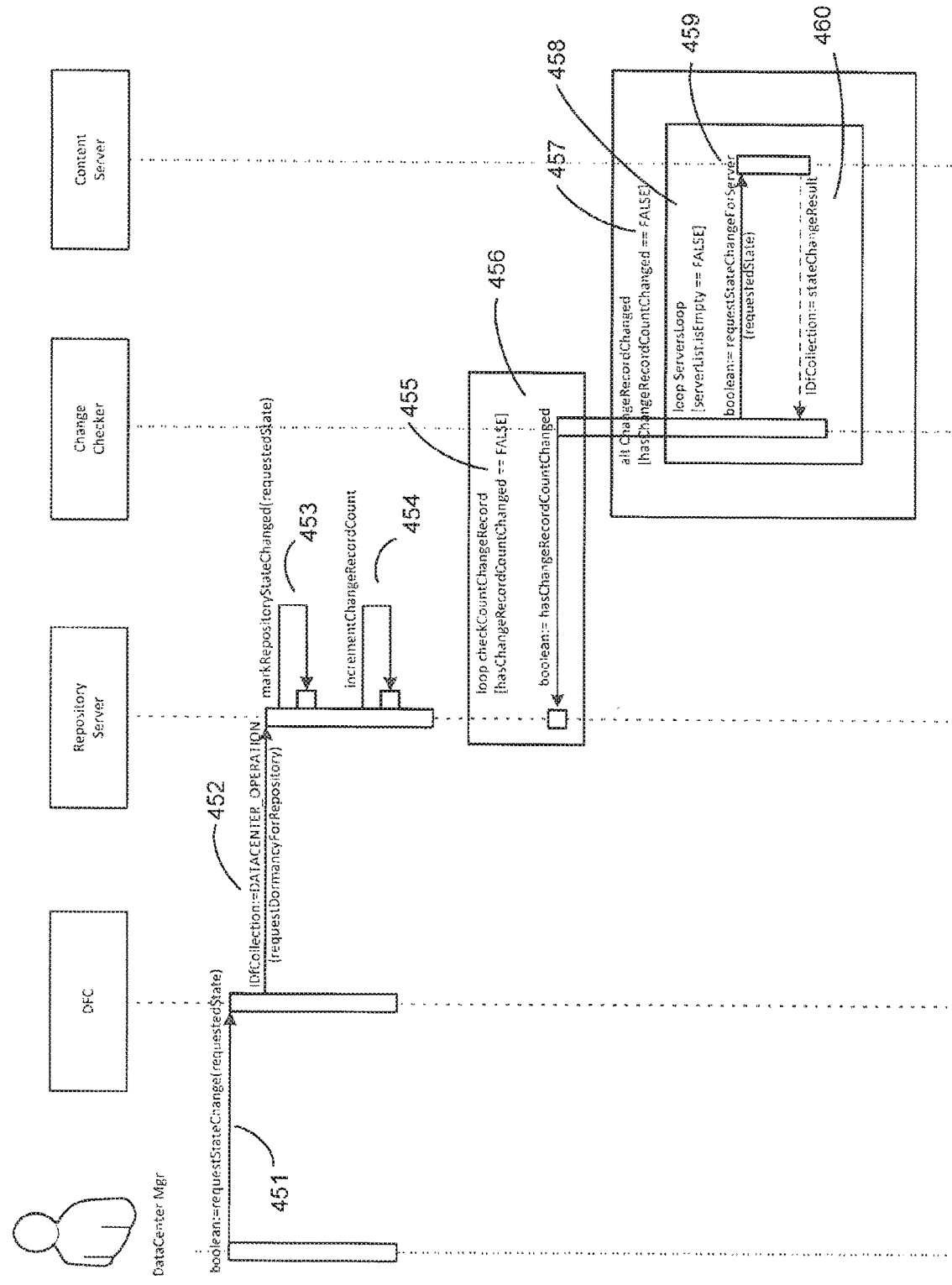
FIG. 9B is a diagram illustrating the sequence for changing state in repository server cluster.

These steps are more clearly illustrated in the sequence diagram for a state change in a server cluster as shown in FIG. 9B. A Data Center Manager requests a state change, which is sent to the DFC layer in step 451. The state change request triggers an RPC in the repository server to "requestDormancyforRepository" in step 452. In step 453, the repository server marks the state change request, and in step 454, the changed record count is incremented.

This leads to a loop to check for a change is the record count with the Change Checker thread in step 455, and when it has changed, that result is returned to the repository in step 456. The Change Checker queries the content server to make that determination in step 457, by running a loop in step 458 until the serverList is not empty. In step 459, the Change Checker issues an instruction to request a state change for the server, and in step 460 the result is returned.

FIG. 10A illustrates a method 340 implemented in the content server or connection broker for checking the dormant status of a single server or multi-server deployment. The status request from the Data Center Manager is received in step 341. If a single server deployment in step 342, then the process checks and interprets values stored in server memory. If not a single server deployment in step 342, then it is a multi-server deployment, and the process 340 checks and interprets values stored in the configuration object for the server cluster.

Figure 10B:
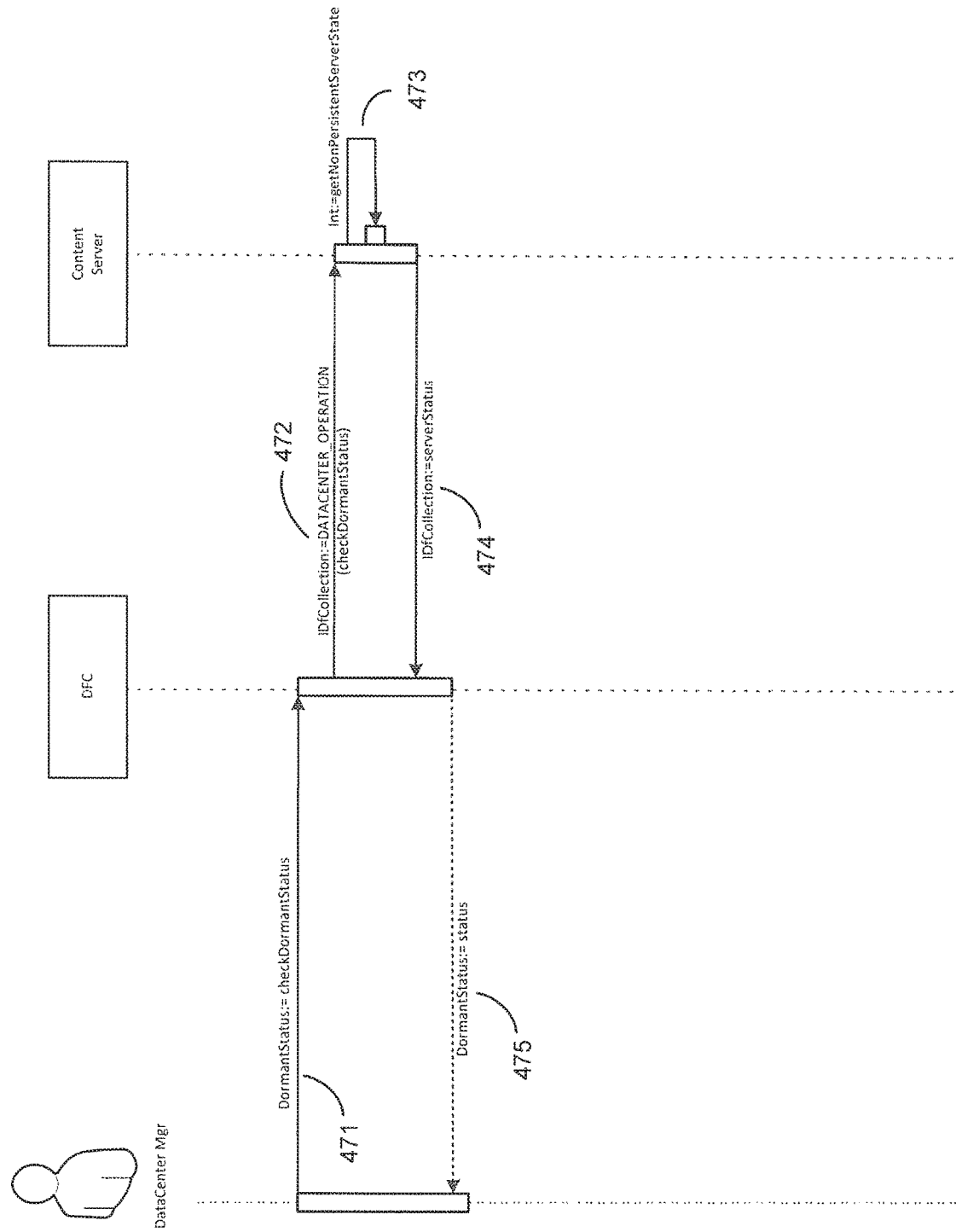
FIG. 10B is a diagram illustrating the sequence for checking dormancy status in the content server.
Figure 10C:
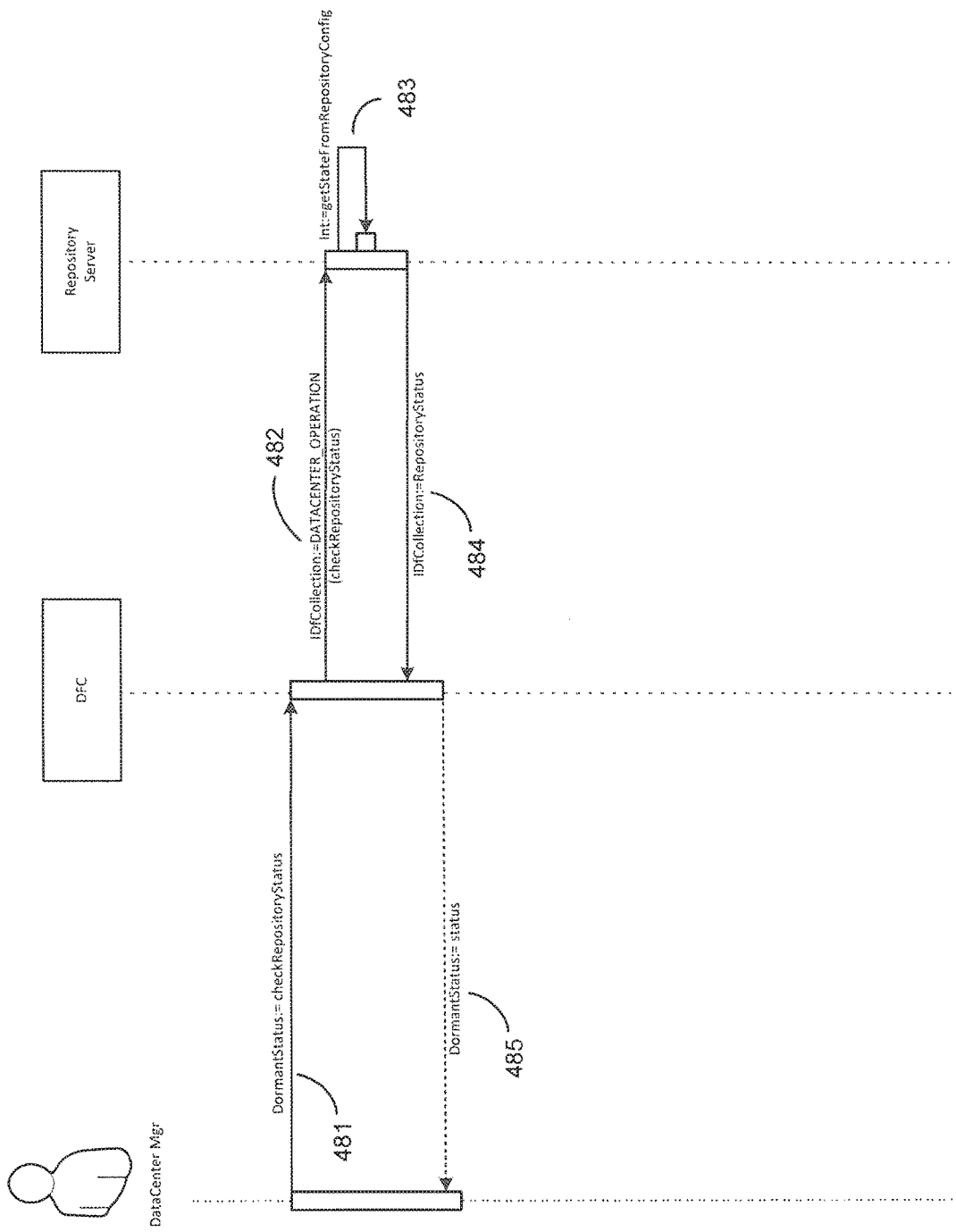
FIG. 10C is a diagram illustrating the sequence for checking dormancy status in the server cluster.

Related sequence diagrams for checking the status of a single content server and a multi-server cluster are shown in FIGS. 10B and 100, respectively. In FIG. 10B, the Data Center Manager requests a status check on the dormant status for the repository in step 471, which causes the DFC to trigger an RPC in the content server to "checkDormantStatus" in step 472. The content server runs a routine to identify the non-persistent state of the server in step 473, and returns that result to the DFC in step 474, which in turn delivers the result to the Data Center Manager in step 475. Similarly, in FIG. 10C, the Data Center Manager requests a status check on the dormant status of the repository server in step 481, which causes the DFC to trigger an RPC in the repository server to "checkRepositoryStatus" in step 482. The repository server retrieves the state of the server from its configuration file in step 483, returns the status to the DFC in step 484, which delivers the result to the Data Center Manager in step 485.

4. Software Upgrade Procedures

In a case where multiple servers (a server cluster) are connected to the same repository, it is desirable to avoid taking the entire production system offline to make changes, for example, software upgrades, patches and/or releases. This can be avoided by providing a dormant state for the servers, thereby allowing one server at a time to be taken offline, changes made, and the server returned to active service. The other servers in the cluster will handle new and existing sessions while one or more servers is dormant. This "rolling upgrade" procedure is illustrated in FIGS. 11A-11C.

Figure 11A:
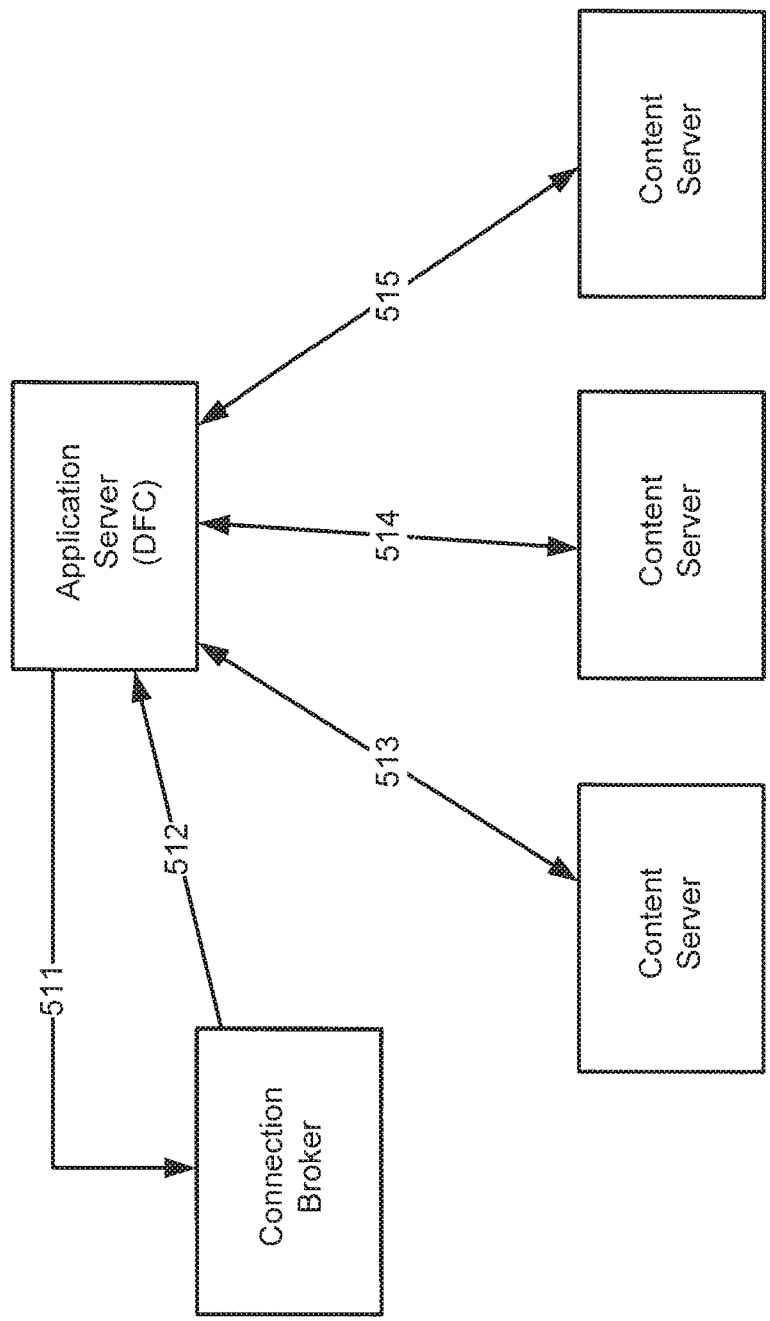
FIGS. 11A-11C are block diagrams illustrating a rolling software upgrade.

In FIG. 11A, with all content servers active, the application server (DFC) seeks to create a new session on behalf of a client device, and thus contacts the connection broker (connection 511) to refresh the current active server map. The connection broker provides a list of active servers back to the application server (connection 512). The DFC then establishes a session with one of the active servers through one of the connections 513, 514 or 515.

Figure 11B:
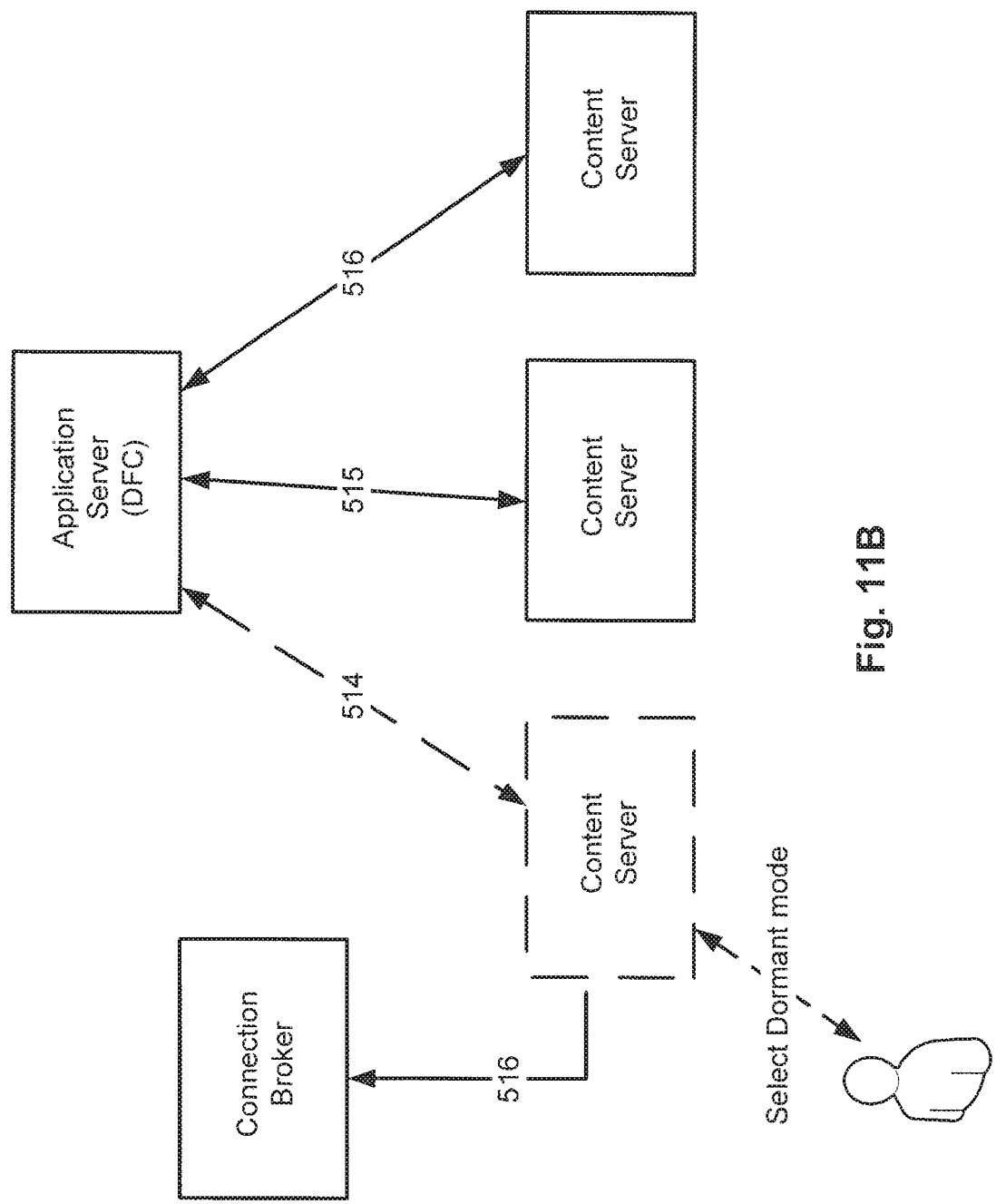
Figure 11C:
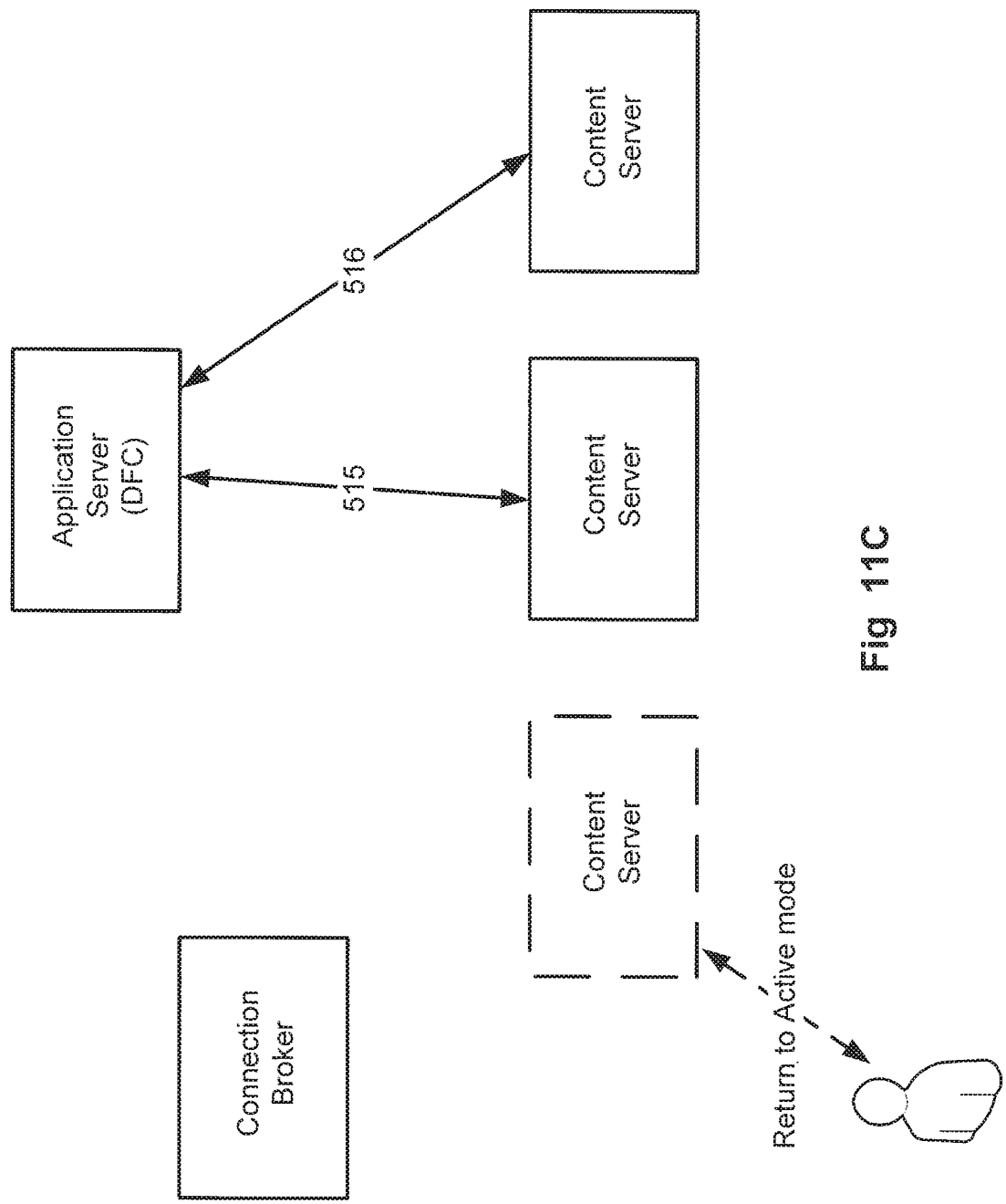

In FIG. 11B, however, the admin has selected an instance of the content server (dashed box) to move to a dormant state. Upon entering the dormant state, the selected content server projects its changed status to the connection broker (connection 516), and the connection broker thereafter knows not to send any new sessions to that content server.

Further, existing sessions with content server (connection 514) are informed that the server has entered the dormant state and become read-only.

In FIG. 11C, the selected content server can be maintained, upgraded or replaced as necessary while in the dormant state, and then returned to active service only when appropriate.

Figure 12:
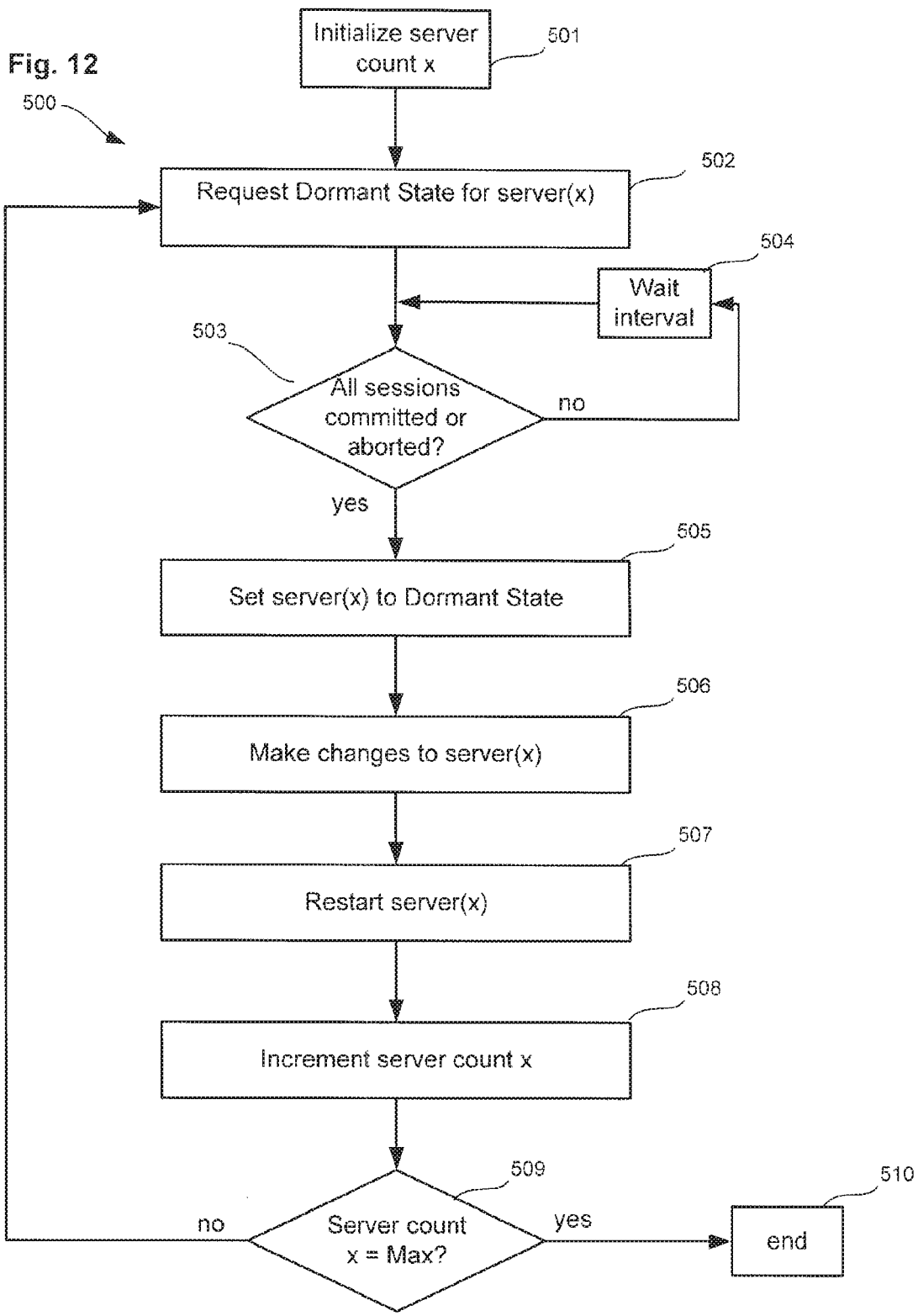
FIG. 12 is a flow chart illustrating a process for moving servers to a dormant state and making changes to the server while in the dormant state.

One process 500 for performing a "rolling upgrade" of one server at a time is illustrated in FIG. 12. A server count x is initialized in step 501, e.g. set equal to one. Other selection or indexing criteria could be used by the Data Center Manager to pick and choose servers. In step 502, the Data Center Manager requests that the selected server be set to the dormant state. Before setting the server to the dormant state, however, the server checks to see if all pending sessions have been committed or aborted in step 503. If not, then the process waits for a predefined interval (step 504), which is set in the configuration file for the server, and checks again in step 503.

When all pending sessions have been committed or aborted in the check of step 503, then the server is set to the dormant state in step 505. As described above, the server will not allow any new connections while in the dormant state. The Data Center Manager makes changes in step 506, for example, software upgrades, patches, service packs and releases, which may include shutting down the server before loading the new software. After loading the new software, the server is restarted in step 507 with a new binary dump. The server count is incremented in step 508, and if the server count has not reached the maximum, then the process returns to step 502 to perform the upgrade on the next server. If the server count has reached its maximum, the process ends in step 510.

Figure 13A:
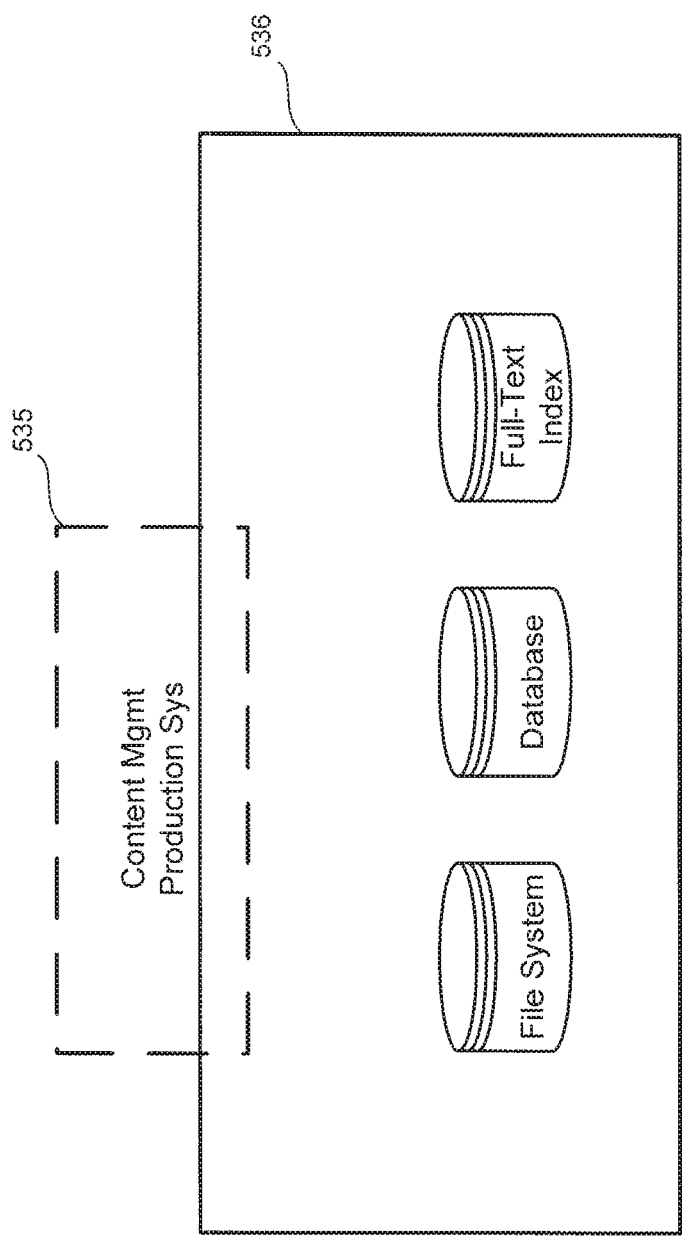
FIGS. 13A-13B are block diagrams illustrating a service pack software upgrade.
Figure 13B:
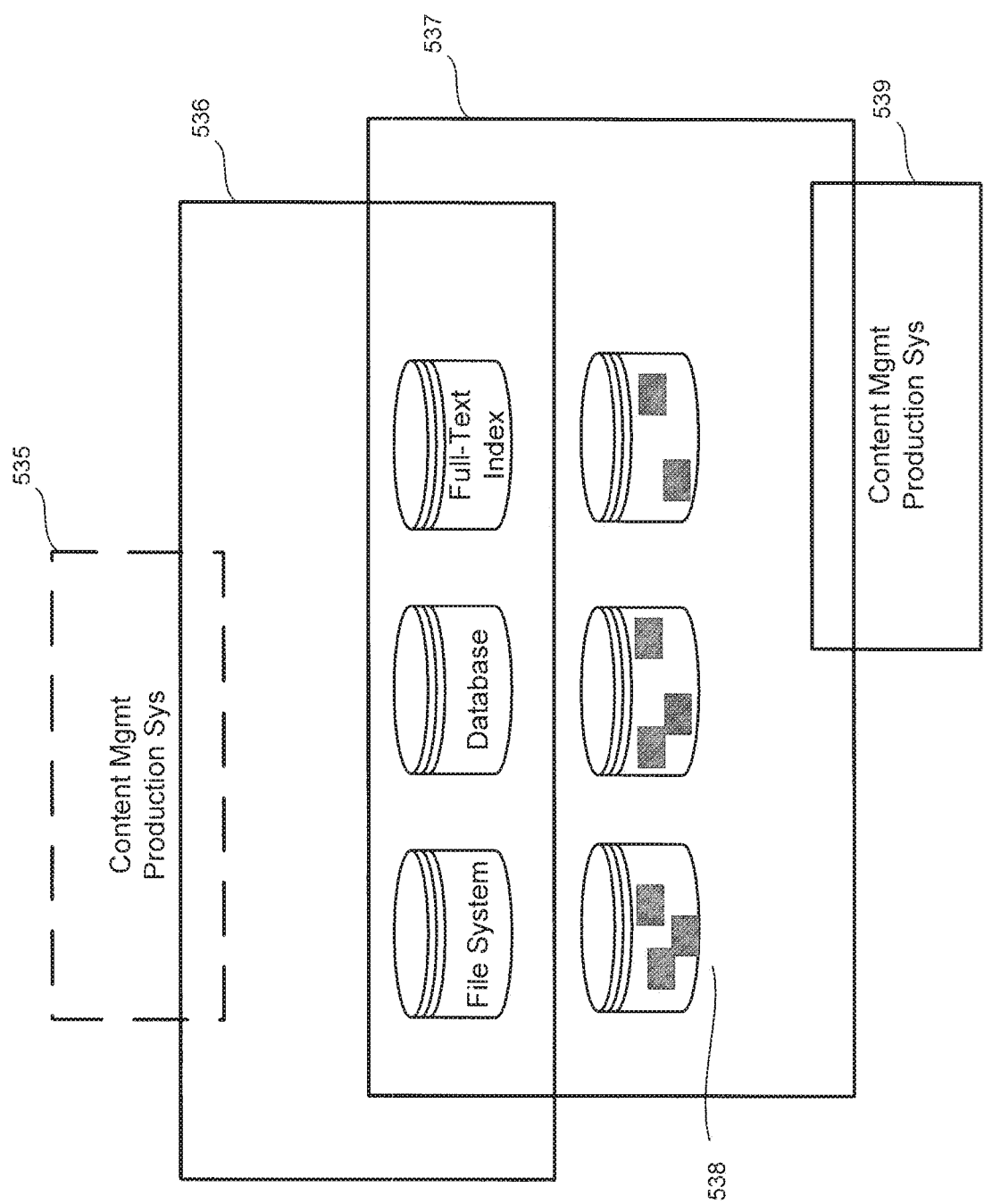

An example of a service pack upgrade is illustrated in FIGS. 13A-13B. In FIG. 13A, the production system 535 is placed into the dormant mode, as shown by the dashed box. Further, the production system operates on read-only snapshot 536 of the file system taken at a discrete point-in-time. In FIG. 13B, a writable copy 537 of the snapshot is created, and upgrades 538 are performed directly on the file system in the snapshot copy. If the upgrade is successful, then users are moved to the upgraded copy of the production system 539.

A process 520 for providing the service pack upgrade is illustrated in FIG. 14. Many servers regularly take a point-in-time snapshot image of the file systems, and in step 521, the Data Center Manager obtains a current point-in-time snapshot of the file system. In step 522, the Data Center Manager requests that all servers in the file system be moved to the dormant state, and in step 523, that the file system be operated on a read-only basis on the snapshot copy of the file system.

In step 524, a writeable copy is created from the point-in-time snapshot, which is used to perform the upgrade in step 525. If the upgrade is successful (step 526), then the servers are returned to the active state based on the upgraded copy (step 527), and all users are moved to the upgraded copy (step 528). The read-only snapshot is discarded in step 529 and the process is done.

If the upgrade was unsuccessful in step 526, then the writable snapshot is discarded (step 530), the point-in-time snapshot is placed into a writable mode (step 531), and the servers are returned to the active state based on the writable point-in-time snapshot copy (step 532).

5. Load Balancing

Use of the dormant state may also provide an effective means for load balancing in a server cluster. The server loads are distributed generally by the connection broker. By setting one or more servers into a dormant mode, the connection broker can redistribute loads to other active servers. This would force reduced loading before it becomes problematic.

Figure 15A:
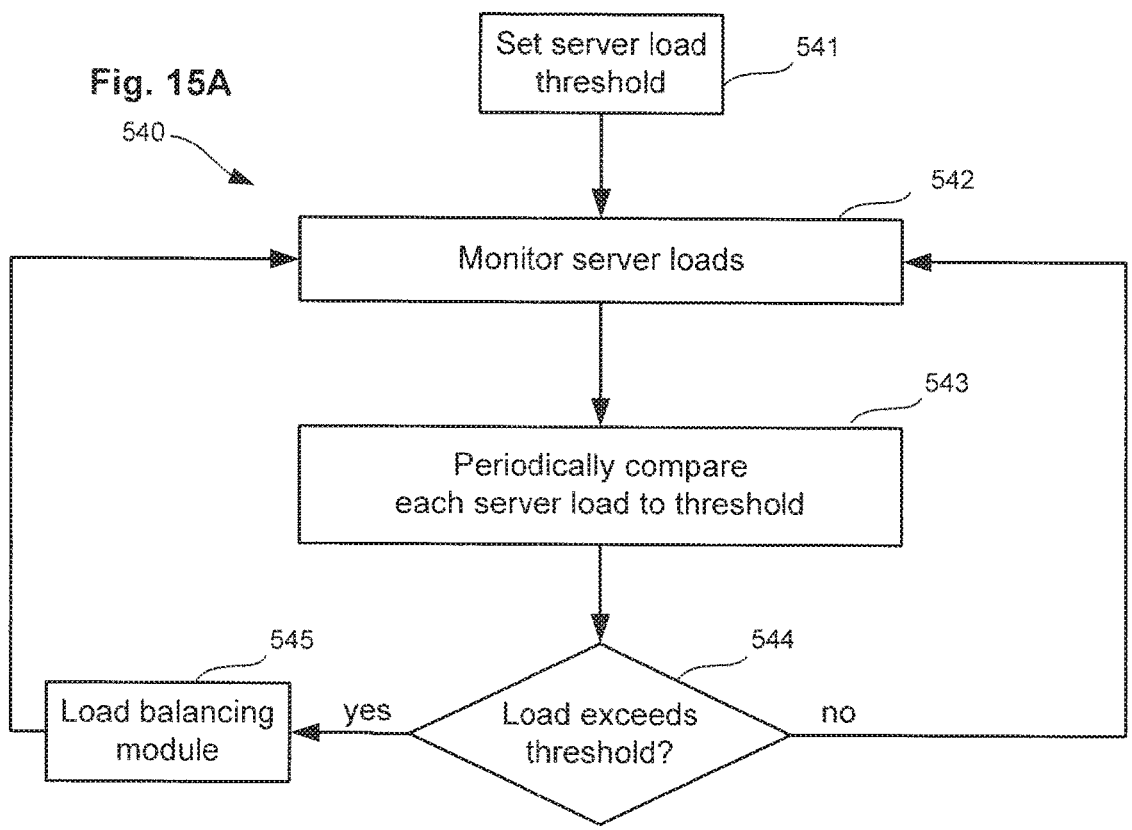
FIGS. 15A and 15B are flow charts illustrating a process for load balancing using the dormant state.

For example, a simple process 540 is shown in FIG. 15A. In step 541, a load threshold is set. In step 542, each of the server loads in the cluster is monitored, for example, by a user in the Data Center Manager group, or with a monitoring software routine in the server itself. In step 543, monitored server loads are periodically compared to the threshold. If no server loads exceed the threshold (step 544), then the process continues to monitor in step 542 and periodically make comparisons in step 543. If a server load does exceed the threshold in step 544, then that server is handled by a load balancing module in step 545, and the process returns to the monitoring step.

Figure 15B:
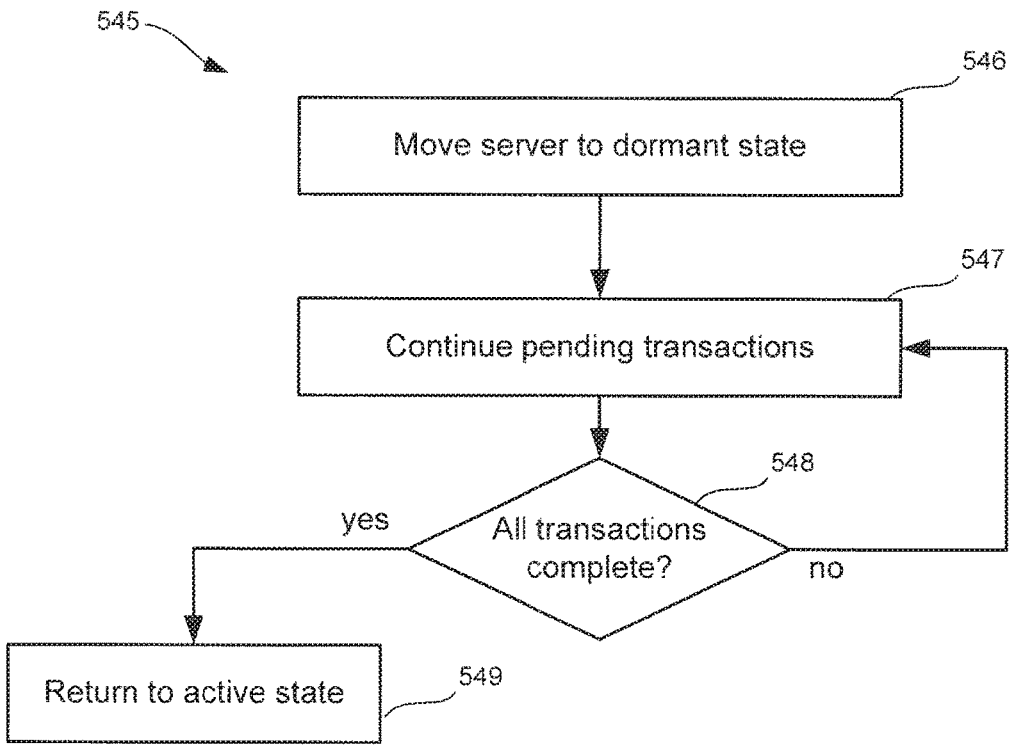

In FIG. 15B, the steps carried out by the load balancing module are shown. In step 546, the overloaded server is placed into the dormant state. At this point, no new connections are accepted from client/users, and the server status is projected to the connection broker, i.e., changed state to dormant. In step 547, pending transactions on existing connections are continued until complete or the server load has fallen to within acceptable limits. Step 548 checks to see if all pending transactions are complete. If not, return to step 547. If so, the server is returned to the active state in step 549.

Of course, one could also use the (dormancy_requested) state described above rather than the dormant state, since the (dormancy_requested) state is provided specifically to complete or terminate pending transactions and connections. Such a process would simply comprise moving the server to the dormancy_requested state, waiting for pending transactions to complete or terminate, then returning to the active state.

There are numerous ways to monitor performance and obtain performance metrics from the server system. For example, machine resources, such as shared memory, CPU usage, file handles, are readily available from the operating system. Resources of the content server may also be monitored and evaluated, such as internal cache usage; response time for each RPC or each user transaction; size of database tables; configuration settings for workflow agents; database usage; and file system usage. Activity response times may be recorded and stored in shared memory; or this information may be obtained through a query from DFC. Global cache and session cache are monitored for cache consumption.

The content server and other components provide an interface to return performance metrics data so that it may be aggregated and analyzed. A service may be called or run to collect relevant information.

6. Dynamic Provisioning

Sometimes server deployments need to be scaled up or down to meet load requirements. Using the dormant mode can be an effective method of scaling down a deployment. Scaling up is simply a matter of adding another server to the server cluster.

Figure 16:
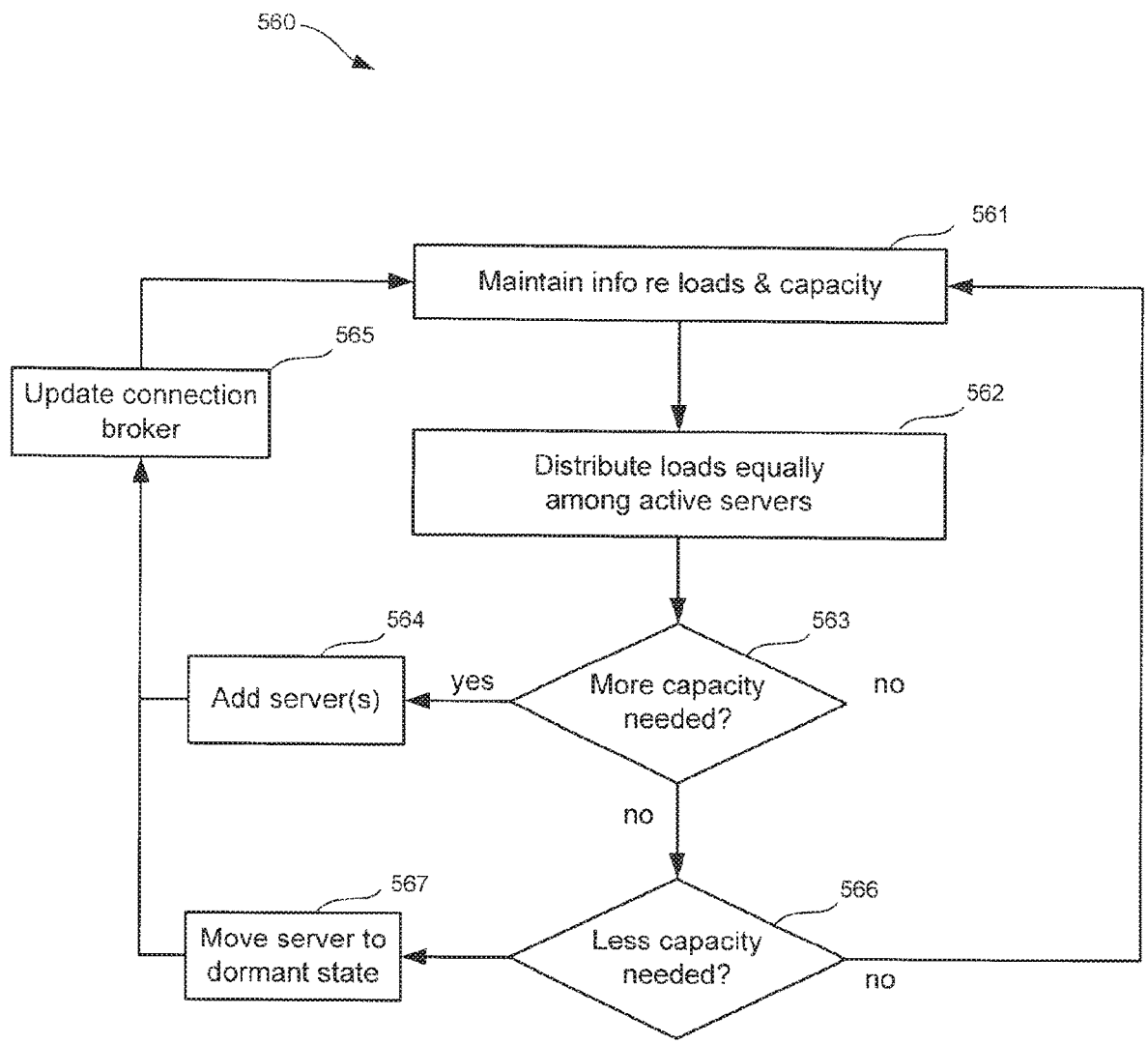
FIG. 16 is a flow chart illustrating a process for dynamic provisioning of server resources using the dormant state.

For example, FIG. 16 shows a simple process 560 for scaling up or scaling down a server deployment. In step 561, the connection broker maintains information about ongoing load requirements and available server capacity. In step 562, the connection broker distributes loads equally across all servers in the cluster. The connection broker periodically evaluates the load requirements, and in step 563, considers whether more capacity is needed, based upon collected metrics. If so, then one or more servers is added to the cluster in step 564. The connection broker is updated in step 565, then returns to maintain and distribute loads in steps 561 and 562. If more capacity was not called for in step 563, then the question of whether less capacity is needed, based upon collected metrics, in considered in step 566. If not, then the process returns to maintain and distribute loads in steps 561 and 562. If so, then one or more servers is moved to a dormant state in step 567, then the connection broker is updated in step 565, and returns to maintain and distribute loads in steps 561 and 562. Any of the dormant state techniques previously described could be incorporated.

APPENDIX

A. API Methods in the DFC Layer

A status indicator called "DormantStatus" is provided to enumerate the present state for the relevant server or repository, and has the state values of ACTIVE (1), DORMANT (2), or DORMANCY_REQUESTED (3).

The following new methods/instructions are added as a method "IDfSession" to the APIs in the DFC layer:

1. Public Boolean requestDormancy( ) Throws DfException

This instruction initiates a request to change the state of the server to which a session is connected to the dormant state. The dormant state is not persistent and the server will become active by default upon a restart or re-initialization. The requestDormancy instruction will return a True result if the request succeeds, False if not, and will throw a DfException if an error occurs.

2. Public DormantStatus checkDormantStatus( ) Throws DfException,

This instruction checks the status of the server to which this session is connected, and returns DormantStatus as an enumeration representing the status of the requested entity. A value of "ACTIVE" means the entity is active; a value of "DORMANCY_REQUESTED" means that the entity has submitted a request to become dormant; and a value of "DORMANT" means the entity is dormant. The instruction will throw a "DfException" if an error occurs while requesting status.

3. Public Boolean makeActive( ) Throws DfException,

This instruction sends a request to move the server to which this session is connected to an active state. The instruction will return "True" if the request succeeds, "False" if not; and will throw a DfException if an error occurs while requesting dormancy.

4. Public Boolean requestDormancy (Boolean allServersForThisRepository) Throws DfException, This instruction sends a request to move the repository or server to a dormant state. When the parameter "allServersForThisRepository" is True, dormancy is requested for this repository. This state is persistent for the repository and will have to be explicitly made active. When false, dormancy is requested only for the server through which this session is connected. The instruction will return True if the request succeeds, False if not, and throws a DfException if an error occurs while requesting dormancy.

5. Public DormantStatus checkDormantStatus (Boolean allServersForThisRepository) Throws DfException;

This instruction checks to see whether a server or repository is dormant or not. When the parameter "allServersForThisRepository" is true, a status check is requested for this repository. When false, a status check is requested only for the server through which this session is connected. The instruction will return a "DormantStatus" enumeration representing the status of the requested entity: ACTIVE means that the entity is active, DORMANCY_REQUESTED means that the entity has submitted a request to become dormant, DORMANT means the entity is dormant. The instruction will throw a DfException if an error occurs while requesting status.

6. Public Boolean makeActive (Boolean allServersForThisRepository) Throws DfException This instruction sends a request to move the repository or server to an active state. When the parameter "allServersForThisRepository" is True, the request is to make the entire repository active. When false, the request is to make only the server to which this session is connected active. The instruction will return True if the request succeeds, False otherwise, and throws a "DfException" if an error occurs while requesting dormancy.

7. Public Boolean enableSaveInDormantState( ) Throws DfException;

This instruction enables a save operation for dormant state. When a server or repository is dormant, no save operations are allowed. A privileged user in the (dm_datacenter_managers) group has to explicitly enable save operation. This method serves that purpose, and will return True if the save was enabled for the user of this session, False otherwise, and throws a "DfException" if an error occurs while enabling save.

8. Public Boolean disableSaveInDormantState( ) Throws DfException;

This instruction disables save operation for the dormant state. When a privileged user from the (dm_datacenter_managers) group has enabled the save operation, it can be disabled back again after performing necessary operation in the dormant state. This method allows the user of this session to disable save operations. The method will return True if the save was disabled for the user of this session, False otherwise, and throws a "DfException" if an error occurs while disabling save.

9. Public Boolean projectDormantStatus( ) Throws DfException;

This instruction only projects to the connection broker that this server is dormant. The server could actually be active. After calling this method, no new connections are made to that server. It will have no impact on existing connections or activities that do not require a new connection. The instruction will return True if projection to connection broker was successful, False otherwise, and throws a "DfException" if an error occurs while projecting dormant status to connection broker.

10. Public Boolean projectActiveStatus( ) Throws DfException;

This instruction only projects to connection broker that this server is active. The server could actually be active. Ideally, this instruction is called after a call to the method "projectDormantStatus;" and will return True if the projection to connection broker was successful, False if not; a DfException will be thrown if an error occurs while projecting dormant status to connection broker or if the server is in DORMANT state and this method is called to make it ACTIVE.

B. RPCs to Support Dormancy-Related Operations

A generic RPC called "DATACENTER_OPERATION" is provided to support all datacenter related operations of which dormancy is one. The following are the dormancy-related datacenter operations and parameters:

1. REQUEST_DORMANCY

This toggles the state of server/repository between dormant and active;

2. CHECK_DORMANCY

This checks the state of the server/repository. The CHECK_DORMANCY operation is different from other operations because it can be run by any user in the repository, instead of being restricted to only privileged users like the Data Center Managers group.

3. ALLOW_SAVE_IN_DORMANT_STATE

This enables update operation in dormant state for privileged group users.

4. DISALLOW_SAVE_IN_DORMANT_STATE

This disables update operation in dormant state for privileged group users.

5. APPLY_TO_ALL_SERVERS

This flag indicates whether dormancy needs to be applied to all servers serving a repository or just to the server that is connected for the current session.

6. REQUEST_STATE

This parameter reflects the state to which this server/repository is being moved. This parameter is meaningful only when the value for DATACENTER_OPERATION is REQUEST_DORMANCY. Valid values are: ACTIVE—state change is going back to the normal state; or DORMANT—state change is going back to the dormant state.

7. PROJECTION_ONLY

This flag indicates to the server that it should only project its status, i.e., dormant or active, to the connection broker. This is used primarily when the server sees its load increasing and wants to reduce the load. For example, if the OPERATION is REQUEST_DORMANCY, and the REQUEST_STATE is DORMANT, then if PROJECTION_ONLY is set to TRUE, then the server will project its status to the connection broker as dormant even though it is actually active. However, if the OPERATION is REQUEST_DORMANCY, and the REQUEST_STATE is ACTIVE, then ifPROJECTION_ONLY is set to TRUE, then the server will project its status to the connection broker as active. The server may be active, but had previously informed the connection broker it was dormant. If the server is dormant and the PROJECTION_ONLY flag is set to true while making the server active, it will throw an error. Also, marking a server as dormant with this flag set to true should stop the server projection to the connection broker, until it is explicitly called to make the server active.

8. RESULT

This is a Boolean flag; when True, the requested operation was successful; when False, the operation was unsuccessful.

9. RESULT_STATE

This is an attribute that will be set when either REQUEST_DORMANCY or CHECK_DORMANCY is executed, and provides more detail regarding the operation. If RESULT is False, then this attribute could contain an error messaging with the details of the failure. If RESULT is True, then this attribute could have the following values: ACTIVE, DORMANCY_REQUESTED, or DORMANCY.

What is claimed is:

1. An enterprise content management system for providing managed access and connections for client devices to a repository through a network, the enterprise content management system comprising:

a plurality of content servers, each content server operable in an active mode or a dormant mode, wherein the content servers are communicatively coupled to a repository;

an application server comprising an application for providing access to the repository through one or more of the content servers, the application server configured to:

receive connection requests from client devices;

request a list of active content servers from a connection broker; and for a connection request from a client device, establish a session with a first active content server from the list of active servers, wherein the repository is accessible through the first active content server during the session; and the connection broker configured to:

receive statuses from the content servers indicating whether each content server is the active mode or the dormant mode;

receive the request for the list of active content servers from the application server; and provide the list of active content servers to the application server.

2. The enterprise content management system of claim 1, wherein the repository includes a file store which stores content items managed by the content management system.

3. The enterprise content management system of claim 2, wherein the repository includes a relational database which stores metadata associated with the content items.

4. The enterprise content management system of claim 2, wherein the repository includes a full-text index store which contains an index of the content items.

5. The enterprise content management system of claim 2, wherein the repository includes directory services content items managed by the content management system.

6. The enterprise content management system of claim 1, wherein each of the plurality of content servers is configured to broadcast the corresponding status to the connection broker.

7. An enterprise content management system for providing managed access and connections for client devices to a repository through a network, the enterprise content management system comprising:

a plurality of content servers, each content server operable in an active mode or a dormant mode, wherein each content server is operable in the active mode to access one or more data stores in a repository;

an application server communicatively coupled to the plurality of content servers by a network, the application server comprising an application for providing access to the one or more data stores in the repository through the one or more of the plurality of content servers;

a connection broker communicatively coupled to the application server and the plurality of content servers;

wherein the application server is configured to receive a connection request from a client device through the network and, responsive to the connection request, request a list of active content servers from the connection broker;

wherein the connection broker is configured to receive statuses from the plurality of content servers indicating whether each of the plurality of content server is in the active mode or the dormant mode and, responsive to receiving the request from the application server for the list of active content servers, provide the list of active content servers to the application server;

wherein the application server is configured to receive the list of active content servers from the connection broker and establish, for the connection request from the client device, a connection via the network with an active content server from the list of active servers, wherein the one or more data stores in the repository are accessible through the connection to the first active content server from the list of active servers.

8. The enterprise content management system of claim 7, wherein the connection is configured to transfer content between the active content server from the list of active servers and the application server.

9. The enterprise content management system of claim 8, wherein the application server is configured to transfer data received from the active content server from the list of active servers to the client device through the network.

10. The enterprise content management system of claim 7, wherein the connection is configured to transfer content between the active content server from the list of active servers and an accelerated content server.

* * * * *